(12) United States Patent
Fukui et al.

(10) Patent No.: US 10,370,565 B2
(45) Date of Patent: Aug. 6, 2019

(54) FLUOROALKYL GROUP-CONTAINING CURABLE ORGANOPOLYSILOXANE COMPOSITION, CURED PRODUCT OF SAME, AND ELECTRONIC COMPONENT AND DISPLAY DEVICE EACH OF WHICH IS PROVIDED WITH SAID CURED PRODUCT

(71) Applicant: Dow Corning Toray Co., Ltd., Tokyo (JP)

(72) Inventors: Hiroshi Fukui, Chiba (JP); Toru Masatomi, Chiba (JP); Takuya Ogawa, Chiba (JP)

(73) Assignee: Dow Toray Co., Ltd., Shinagawa-Ku, Tokyo (JP)

( * ) Notice: Subject to any disclaimer, the term of this patent is extended or adjusted under 35 U.S.C. 154(b) by 183 days.

(21) Appl. No.: 15/535,616

(22) PCT Filed: Dec. 11, 2015

(86) PCT No.: PCT/JP2015/006198
§ 371 (c)(1),
(2) Date: Sep. 6, 2017

(87) PCT Pub. No.: WO2016/098334
PCT Pub. Date: Jun. 23, 2016

(65) Prior Publication Data
US 2018/0215958 A1    Aug. 2, 2018

(30) Foreign Application Priority Data
Dec. 16, 2014 (JP) ................ 2014-254384

(51) Int. Cl.
| | |
|---|---|
| *C09J 7/38* | (2018.01) |
| *B32B 15/16* | (2006.01) |
| *G06F 3/041* | (2006.01) |
| *H01M 4/131* | (2010.01) |
| *H01M 4/133* | (2010.01) |
| *H01M 4/48* | (2010.01) |
| *H01M 4/62* | (2006.01) |
| *H01M 10/0525* | (2010.01) |
| *B32B 15/20* | (2006.01) |
| *C09J 7/25* | (2018.01) |
| *H01M 4/02* | (2006.01) |

(52) U.S. Cl.
CPC ............... *C09J 7/38* (2018.01); *B32B 15/16* (2013.01); *B32B 15/20* (2013.01); *C09J 7/255* (2018.01); *H01M 4/131* (2013.01); *H01M 4/133* (2013.01); *H01M 4/483* (2013.01); *H01M 4/621* (2013.01); *H01M 4/625* (2013.01); *H01M 10/0525* (2013.01); *B32B 2264/104* (2013.01); *B32B 2264/108* (2013.01); *B32B 2264/12* (2013.01); *B32B 2307/202* (2013.01); *B32B 2457/10* (2013.01); *C09J 2467/006* (2013.01); *C09J 2483/00* (2013.01); *G06F 3/041* (2013.01); *H01M 2004/027* (2013.01)

(58) Field of Classification Search
CPC ........................................ C09J 7/38
See application file for complete search history.

(56) References Cited

U.S. PATENT DOCUMENTS

| | | | |
|---|---|---|---|
| 5,349,004 A | 9/1994 | Kumar et al. | |
| 5,349,037 A * | 9/1994 | Fujiki | ..... C09J 183/08 528/15 |
| 5,356,719 A * | 10/1994 | Hamada | ..... C08L 83/08 428/447 |
| 5,436,303 A | 7/1995 | Lin | |
| 5,447,987 A * | 9/1995 | Sato | ..... C08L 83/04 524/263 |

(Continued)

FOREIGN PATENT DOCUMENTS

| | | |
|---|---|---|
| EP | 1122284 A1 | 8/2001 |
| JP | 2001200221 A | 7/2001 |

(Continued)

OTHER PUBLICATIONS

PCT/JP2015/006198 International Search Report dated Jan. 26, 2016, 2 pages.

(Continued)

*Primary Examiner* — Nicole M Buie-Hatcher
(74) *Attorney, Agent, or Firm* — Warner Norcross + Judd LLP

(57) ABSTRACT

A curable organopolysiloxane composition containing a fluoroalkyl group, the curable organopolysiloxane composition containing:

(A) $(R^1_3SiO_{1/2})_a(R^2_2SiO)_b(R^3SiO_{3/2})_c(SiO_2)_d$
where 10 mol % or more of substitution groups are fluoroalkyl groups, other substitution groups are alkyl groups or the like, and a, b, c, and d represent a number satisfying $0 \le a \le 0.5$, $0 \le b \le 0.7$, $0 \le c \le 1$, $0 \le d \le 0.7$, $0.3 \le c+d \le 1$, and $a+b+c+d=1$;

(B) $R^4_3Si(OSiR^4_2)_eOSiR^4_3$
where 5 mol % or more of substitution groups are fluoroalkyl groups, and of other $R^4$s, at least two are alkenyl groups;

(C) is an organohydrogen polysiloxane;

(D) is an effective amount of a hydrosilylation reaction catalyst; and (E) is a solvent.

The curable composition provides a high dielectric constant and favorable transparency. A pressure-sensitive adhesive as a cured product thereof, and a display device, are also provided.

18 Claims, No Drawings

(56) References Cited

U.S. PATENT DOCUMENTS

| | | | |
|---|---|---|---|
| 5,482,991 A | 1/1996 | Kumar et al. | |
| 7,253,238 B2 | 8/2007 | Griswold et al. | |
| 2006/0229424 A1 | 10/2006 | Griswold et al. | |
| 2008/0057251 A1 | 3/2008 | Griswold et al. | |
| 2008/0058490 A1* | 3/2008 | Le | C08L 83/04 528/31 |
| 2012/0231245 A1 | 9/2012 | Kim et al. | |
| 2013/0069890 A1 | 3/2013 | Lee et al. | |
| 2013/0236730 A1 | 9/2013 | Böse et al. | |

FOREIGN PATENT DOCUMENTS

| | | | |
|---|---|---|---|
| JP | 2006290960 A | 10/2006 | |
| JP | 2008537972 A | 10/2008 | |
| JP | 2010502781 A | 1/2010 | |
| JP | 2010108490 A | 5/2010 | |
| JP | 2011222679 A | 11/2011 | |
| JP | 2013512326 A | 4/2013 | |
| JP | 2014522436 A | 9/2014 | |
| WO | WO9406878 A1 | 3/1994 | |
| WO | WO2012166870 A1 | 12/2012 | |
| WO | WO2014105959 A1 | 7/2014 | |

OTHER PUBLICATIONS

English language abstract and machine translation for JP2001200221 (A) extracted from http://worldwide.espacenet.com database on Aug. 8, 2017, 10 pages.

English language abstract and machine translation for JP2006290960 (A) extracted from http://worldwide.espacenet.com database on Aug. 8, 2017, 15 pages.

English language abstract and machine translation for JP2010108490 (A) extracted from http://worldwide.espacenet.com database on Aug. 8, 2017, 39 pages.

English language abstract and machine translation for JP2011222679 (A) extracted from http://worldwide.espacenet.com database on Aug. 8, 2017, 30 pages.

\* cited by examiner

US 10,370,565 B2

FLUOROALKYL GROUP-CONTAINING CURABLE ORGANOPOLYSILOXANE COMPOSITION, CURED PRODUCT OF SAME, AND ELECTRONIC COMPONENT AND DISPLAY DEVICE EACH OF WHICH IS PROVIDED WITH SAID CURED PRODUCT

CROSS-REFERENCE TO RELATED APPLICATIONS

This application is the National Stage of International Application No. PCT/JP2015/006198 filed on 11 Dec. 2015, which claims priority to and all advantages of Japanese Patent Application No. 2014-254384 filed on 16 Dec. 2014, the content of which is hereby incorporated by reference.

TECHNICAL FIELD

The present invention relates to a curable organopolysiloxane composition containing a fluoroalkyl group with a high dielectric constant and favorable transparency, a laminate body film including a pressure-sensitive adhesive as a cured product thereof, and a display device including the laminate body film.

BACKGROUND ART

Polysiloxane pressure-sensitive adhesive compositions have excellent electrical insulating properties, heat resistance, cold resistance, and pressure-sensitive adhesion with regard to various adherends as compared to an acrylic or rubber pressure-sensitive adhesive compositions, and therefore are used in heat resistant pressure-sensitive adhesive tape, electrical insulating pressure-sensitive adhesive tape, heat sealing tape, plating masking tape, and the like. The polysiloxane pressure-sensitive adhesive compositions are categorized into addition reaction curing types, condensation reaction curing types, peroxide curing types, and the like, based on the curing mechanism thereof. The addition reaction curing type pressure-sensitive adhesive compositions are widely used, because curing is quickly performed at room temperature or by heating, and byproducts are not generated.

In recent years, application to the field of electronic display elements such as smart devices and the like has been studied, utilizing the aforementioned properties and high transparency of the polysiloxane pressure-sensitive adhesives. The device has a structure where a film formed from a plurality of layers including an electrode layer and display layer is interposed between transparent substrates, and in order to protect the electrode layer and display layer and improve adhesion between the layers, a polysiloxane pressure-sensitive adhesive with high heat resistance, cold resistance, and transparency is expected to function effectively.

In these smart apparatuses, high dielectric properties are included in addition to excellent transparency as material properties of the pressure-sensitive adhesive required in pressure sensors and other sensor applications. In order to enhance the sensor sensitivity, a high electrostatic capacitance under a constant voltage must be achieved, and for this purpose, a high dielectric constant is required in the material that is used. Examples of a polymeric material with high specific permittivity include polyvinylidene fluorides and polyvinylidene fluoride copolymers, which are known to be used as piezoelectric materials or pyroelectric materials. For example, Japanese Unexamined Patent Application Publication No. 2010-108490 (Patent Literature 1) describes a transparent piezoelectric sheet including a vinylidene fluoride-tetrafluoroethylene copolymer, and use of the sheet in a touch panel. Furthermore, Japanese Unexamined Patent Application Publication No. 2011-222679 (Patent Literature 2) describes using a vinylidene fluoride-trifluoroethylene copolymer and polyvinylidene fluoride as a material for a transparent piezoelectric body film of a transparent piezoelectric sheet, in addition to a vinylidene fluoride-tetrafluoroethylene copolymer. On the other hand, a vinylidene fluoride polymer has high crystallinity, and therefore has problems with inferior processability for manufacturing a molded product such as a film or the like.

On the other hand, the specific permittivity of a general-purpose polymeric material with excellent transparency and processability normally has a value of 2 to 4, but by appropriately designing the polymer structure, the value can be increased to 5 to 7 or higher. In order to enhance the specific permittivity of polysiloxane, introducing a fluoroalkyl group as a substitution group on a silicon atom was already known to be effective, and the present inventors also disclosed that an organopolysiloxane cured product containing a fluoroalkyl group has high specific permittivity, and is useful as a transducer material (International Patent Publication 2014-105959, Patent Literature 3).

On the other hand, a pressure-sensitive adhesive containing an organopolysiloxane containing a fluoroalkyl group is also already being researched. For example, U.S. Pat. No. 5,436,303 (Patent Literature 4) discloses a pressure-sensitive adhesive containing a fluoroalkyl silicone and MQ resin having a silanol group, formed from $R_3SiO_{1/2}$ units (where R represents an alkyl group) and $SiO_{4/2}$ units. Furthermore, International Patent Publication 1994-6878 (Patent Literature 5) describes a copolymer formed from a fluoroalkyl silicone and vinyl monomer and a pressure-sensitive adhesive with favorable solvent resistance containing the copolymer. With these technologies, an MQ resin which is a key for pressure-sensitive adhesion does not have a fluoroalkyl group, and the transparency is unclear and actually not described. On the other hand, U.S. Pat. No. 7,253,238 (Patent Literature 6) describes an MQ resin containing a fluoroalkyl group, formed from $R_3SiO_{1/2}$ units (where R represents an alkyl group), $R(CH_2=CH)SiO_{2/2}$ units (where R represents an alkyl group), and $SiO_{4/2}$ units, and a pressure-sensitive adhesive containing the resin. Furthermore, U.S. Pat. No. 5,066,078 (Patent Literature 7) discloses an MR resin containing a fluoroalkyl group where the method of manufacturing is limited, and a pressure-sensitive adhesive containing the resin. Furthermore, Japanese Unexamined Patent Application Publication No. 2010-502781 (Patent Literature 8) also discloses a laminate body formed from a fluoroalkyl silicone pressure-sensitive adhesive composition and silicone liner. However, with these pressure-sensitive adhesive compositions, only a peroxide curing system is disclosed, and an addition type curing system with a high curing rate, almost no shrinking during mold processing, and in which desired curing conditions are easy to set has not been studied. Furthermore, dielectric properties also have not been studied, and there is no mention nor suggestion thereof. Therefore, an addition curing type organopolysiloxane containing an fluoroalkyl group with excellent transparency and high specific permittivity, a pressure-sensitive adhesive laminate body film containing the organopolysiloxane, and a display device configured from the pressure-sensitive adhesive laminate body film have not been reported to date.

On the other hand, an optically transparent silicone pressure-sensitive adhesive film and a structure of a display device such as a touch panel or the like using the film is disclosed in Japanese PCT Patent Application 2014-522436 (Patent Literature 9), Japanese PCT Patent Application 2013-512326 (Patent Literature 10), and the like, but the performance of the silicone pressure-sensitive adhesive film still has room for improvement.

CITATION LIST

Patent Literature

Patent Literature 1: Japanese Unexamined Patent Application Publication No. 2010-108490
Patent Literature 2: Japanese Unexamined Patent Application Publication No. 2011-222679
Patent Literature 3: International Patent Publication 2014/105959
Patent Literature 4: U.S. Pat. No. 5,436,303
Patent Literature 5: International Patent Publication 1994/16878
Patent Literature 6: U.S. Pat. No. 7,253,238
Patent Literature 7: U.S. Pat. No. 5,066,078
Patent Literature 8: Japanese Unexamined Patent Application Publication No. 2010-502781
Patent Literature 9: Japanese PCT Patent Application 2014-522436
Patent Literature 10: Japanese PCT Patent Application 2013-512326

SUMMARY OF INVENTION

Technical Problem

In order to resolve the aforementioned problems, an object of the present invention is to provide an organopolysiloxane containing a fluoroalkyl group with a high specific permittivity and favorable processability for manufacturing a molded product such as a film or the like, and having a function as a pressure-sensitive adhesive, without impairing excellent transparency of the organopolysiloxane cured product containing a fluoroalkyl group. Furthermore, an object is to provide an addition curing type organopolysiloxane composition containing a fluoroalkyl group with almost no shrinking during mold processing, high curing rate, and in which desired curing conditions are easy to set. Furthermore, an object is to provide an application of the organopolysiloxane composition containing a fluoroalkyl group as an electronic material and electronic member for a display device, and particularly a transducer material such as a sensor or the like.

Solution to Problem

As a result of extensive studies in order to resolve the aforementioned problems, the present inventors discovered that the aforementioned problems can be resolved by a curable organopolysiloxane containing a fluoroalkyl group that can be cured by an addition reaction using an organohydrogen polysiloxane, having as primary components a straight chain liquid organopolysiloxane containing a fluoroalkyl group that contains a specific amount or more of a fluoroalkyl group, and a three-dimensional resin organopolysiloxane containing a fluoroalkyl group that contains a specific amount or more of a fluoroalkyl group, thereby achieving the present invention. The cured product of the curable organopolysiloxane composition containing a fluoroalkyl group can be used as a new pressure-sensitive adhesive material with excellent transparency and high specific permittivity. Note that the present inventors discovered that the aforementioned problems can be more preferably resolved when the fluoroalkyl group is a trifluoropropyl group, and that the aforementioned problems can be even more preferably resolved if the organohydrogen polysiloxane is a resin organohydrogen polysiloxane having a trifluoropropyl group in a molecule, thereby arriving at the present invention.

In other words, a first object of the present invention is resolved by a curable organopolysiloxane composition containing a fluoroalkyl group, containing:

[1] (A) 1 to 80 mass % of an organopolysiloxane as expressed by average unit formula (I) with regard to the sum of components (A) to (D)

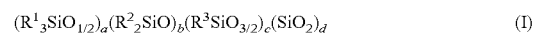

$(R^1{}_3SiO_{1/2})_a(R^2{}_2SiO)_b(R^3SiO_{3/2})_c(SiO_2)_d$ (I)

{Where 10 mol % or more of all substitution groups on a silicon atom as expressed by $R^1$, $R^2$, and $R^3$ are fluoroalkyl groups as expressed by $(C_pF_{2p+1})$—R— (R represents an alkylene group with 1 to 10 carbon atoms, and p represents an integer from 1 to 8),
the substitution groups as expressed by $R^1$, $R^2$, and $R^3$ are the same or different fluoroalkyl groups, alkyl groups with 1 to 12 carbon atoms, alkenyl groups with 2 to 12 carbon atoms, aryl groups with 6 to 20 carbon atoms, aralkyl groups with 7 to 20 carbon atoms, a hydroxyl group, or alkoxy groups with 1 to 6 carbon atoms, and
a, b, c, and d are numbers that satisfy $0 \leq a \leq 0.5$, $0 \leq b \leq 0.7$, $0 \leq c \leq 1$, $0 \leq d \leq 0.7$, $0.3 \leq c+d \leq 1$, and $a+b+c+d=1$};
(B) 20 to 99 mass % of an organopolysiloxane as expressed by average unit formula (II) with regard to the sum of components (A) to (D)

$R^4{}_3Si(OSiR^4{}_2)_eOSiR^4{}_3$ (II)

{Where 5 mol % or more of all substitution groups on a silicon atom as expressed by $R^4$ are fluoroalkyl groups as expressed by $(C_pF_{2p+1})$—R— (R represents the same groups as above, and p represents the same numbers as above),
$R^4$ is the same or different fluoroalkyl groups, alkyl groups with 1 to 12 carbon atoms, alkenyl groups with 2 to 12 carbon atoms, aryl groups with 6 to 20 carbon atoms, aralkyl groups with 7 to 20 carbon atoms, a hydroxyl group, or alkoxy groups with 1 to 6 carbon atoms, where of all of the $R^4$s, at least two are alkenyl groups with 2 to 12 carbon atoms, and e represents a number that satisfies $5 < e < 100,000$};
(C) an organohydrogen polysiloxane having at least two silicon-bonded hydrogen atoms in a molecule in an amount where the silicon atom-bonded hydrogen atoms in the molecule are 0.1 to 40 mols with regard to a total amount of 1 mol of alkenyl groups of component (A) and component (B);
(D) an effective amount of a hydrosilylation reaction catalyst; and
(E) 0 to 2000 parts by mass of a solvent with regard to 100 parts by mass of the sum of components (A) to (D).

The first object of the present invention is preferably resolved by the following compositions.

[2] The curable organopolysiloxane composition containing a fluoroalkyl group according to [1], wherein in the average unit formula (I), c is a number within a range of $0 < c \leq 1$.

[3] The curable organopolysiloxane composition containing a fluoroalkyl group according to [1] or [2], wherein the component (A) is an organopolysiloxane that does not contain an alkenyl group with 2 to 12 carbon atoms.

[4] The curable organopolysiloxane composition containing a fluoroalkyl group according to any one of [1] to [3], wherein the fluoroalkyl group as expressed by $(C_pF_{2p+1})$—R— (R represents the same group as above, and p represents the same number as above) in the component (A) and component (B) is a trifluoropropyl group.

The first object of the present invention is particularly preferably resolved by the following compositions for component (C).

[5] The curable organopolysiloxane composition containing a fluoroalkyl group according to any one of [1] to [4], wherein the component (C) is an organohydrogen polysiloxane having a group containing fluorine.

[6] The curable organopolysiloxane composition containing a fluoroalkyl group according to any one of [1] to [5], wherein the component (C) is an organohydrogen polysiloxane having a fluoroalkyl group as expressed by $(C_pF_{2p+1})$—R— (R represents the same group as above, and p is the same number as above) in a molecule.

[7] The curable organopolysiloxane composition containing a fluoroalkyl group according to any one of [1] to [6], wherein the component (C) is a resin organohydrogen polysiloxane having a trifluoropropyl group in a molecule.

A second object of the present invention is use of a pressure-sensitive adhesive, and is achieved by the following inventions.

[8] A pressure-sensitive adhesive composition, containing the curable organopolysiloxane composition containing a fluoroalkyl group according to any one of [1] to [7].

[9] A cured product formed by curing the curable organopolysiloxane composition containing a fluoroalkyl group according to any one of [1] to [7].

[10] A pressure-sensitive adhesive layer formed by curing the curable organopolysiloxane composition containing a fluoroalkyl group according to any one of [1] to [7].

[11] The pressure-sensitive adhesive layer according to [10], which is in a film form and is substantially transparent.

A third object of the present invention is a laminate body provided with a cured layer formed from the curable composition of the present invention and an application thereof, and is achieved by the following inventions.

[12] A laminate body, containing a cured layer formed by curing the curable organopolysiloxane composition containing a fluoroalkyl group according to any one of [1] to [7] on a film substrate.

[13] The laminate body according to [12], wherein the cured layer is a pressure-sensitive adhesive layer, and a peeling layer with regard to the pressure-sensitive adhesive layer is provided on a film substrate.

A fourth object of the present invention is an application of a cured product formed by the curable composition of the present invention as an electronic material or member for a display device, and an electronic component/display device including the material or member, and is achieved by the following inventions.

[14] A member for a display device or electronic material, formed by curing the curable organopolysiloxane composition containing a fluoroalkyl group according to any one of [1] to [7].

[15] A display device or electronic component, including: the member for a display device or electronic material according to [14].

[16] A display or display panel, containing the film-shaped and substantially transparent pressure-sensitive adhesive layer according to [11].

A fifth object of the present invention is a touch panel using a cured product formed by the curable composition of the present invention, and is achieved by the following inventions.

[17] A touch panel, including:
a substrate on which a conductive layer is formed on one surface; and
a cured layer formed by curing the curable organopolysiloxane composition containing a fluoroalkyl group according to any one of [1] to [7], adhered to the conductive layer of the substrate.

[18] The touch panel according to [17], wherein the substrate on which the conductive layer is formed is a resin film or glass on which an ITO layer is formed on one surface.

Advantageous Effects of Invention

The present invention can provide an organopolysiloxane composition containing a fluoroalkyl group with a high specific permittivity, with excellent transparency of a cured product, that can be used as a pressure-sensitive adhesive, and with favorable mold processability such as a film form or the like. The organopolysiloxane composition containing a fluoroalkyl group is an addition curing type composition, and has advantages of almost no shrinking during mold processing, a high curing rate, and in which desired curing conditions are easy to set. A pressure-sensitive adhesive layer, and particularly a pressure-sensitive adhesive film, formed using the organopolysiloxane composition containing a fluoroalkyl group can be preferably used as an application of an electronic material or electronic member for a display device, and particularly a transducer material of a sensor or the like, and particularly has an advantage of being able to provide a display device such as a touch panel or the like including the pressure-sensitive adhesive film.

DESCRIPTION OF EMBODIMENTS

A curable organopolysiloxane composition containing a fluoroalkyl group of the present invention will be described below in detail. A curable organopolysiloxane composition containing a fluoroalkyl group of the present invention contains the following components (A) to (D), and these components will be described first.

[Component (A)]

Component (A) is a resin organopolysiloxane as expressed by average unit formula (I), having a constant amount or more of a fluoroalkyl group, and essentially having a $R^3SiO_{3/2}$ unit (trifunctional siloxy unit) or $SiO_2$ unit (tetrafunctional siloxy unit). The component (A) has a constant amount of fluoroalkyl groups, and therefore has excellent affinity with component (B) having the same fluoroalkyl groups, excellent transparency, and a relatively high specific permittivity. Furthermore, the component (A) has a three-dimensional resin structure, and therefore can provide pressure-sensitive adhesive properties to an obtained cured product.

Specifically, average unit formula:

$$(R^1{}_3SiO_{1/2})_a(R^2{}_2SiO)_b(R^3SiO_{3/2})_c(SiO_2)_d \qquad (I)$$

In the formula, 10 mol % or more, preferably 20 mol % or more, and more preferably 40 mol % or more of all substitution groups on a silicon atom as expressed by $R^1$, $R^2$, and $R^3$ are fluoroalkyl groups as expressed by $(C_pF_{2p+1})$—R— (R represents an alkylene group with 1 to 10 carbon atoms, and p represents an integer from 1 to 8). When the amount of the fluoroalkyl groups is less than the lower limit, the affinity with component (B) described later is reduced, and the transparency and specific permittivity of a cured product obtained by curing the curable organopolysiloxane composition are reduced, and therefore is inappropriate. Note that if the amount of fluorine atoms in a fluoroalkyl group as expressed by $(C_pF_{2+0})$—R— is high, in other words, the p value is high, for example p≥4, and the number of carbon atoms in an alkylene group which is R is low, the amount of the fluoroalkyl groups can achieve a technical effect of the present invention even with a value close to the lower limit of the aforementioned range. In particular, the content rate of fluorine atoms in the component (A) is preferably 10 mass % or more when considering the specific permittivity and affinity with component (B). Note that if a trifluoropropyl group is selected as the fluoroalkyl group, setting all substitution groups on a silicon atom as expressed by the aforementioned $R^1$, $R^2$, and $R^3$ to 40 mol % or more, and particularly 50 mol % or more is one of the most preferred embodiments of the present invention.

The fluoroalkyl group as expressed by $(C_pF_{2p+1})$—R— is an essential functional group in component (A) and component (B) of the present invention, and is a preferred functional group in component (C). The fluoroalkyl group provides a cured product with an excellent specific permittivity, improves compatibility of the components due to the components having a fluorine atom, and provides a cured product with excellent transparency. Specific examples of the fluoroalkyl group include trifluoropropyl groups, pentafluorobutyl groups, heptafluoropentyl groups, nonafluorohexyl groups, undecafluoroheptyl groups, tridecafluorooctyl groups, pentadecafluorononyl groups, and heptadecafluorodecyl groups. Of these, a group where p=1, in other words, a trifluoropropyl group is a preferred group from the perspective of pressure-sensitive adhesion, economy, ease of manufacturing, and molding processability of the obtained curable organopolysiloxane composition.

The substitution groups as expressed by $R^1$, $R^2$, and $R^3$ are the same or different fluoroalkyl groups, alkyl groups with 1 to 12 carbon atoms, alkenyl groups with 2 to 12 carbon atoms, aryl groups with 6 to 20 carbon atoms, aralkyl groups with 7 to 20 carbon atoms, hydroxyl groups, or alkoxy groups with 1 to 6 carbon atoms. A methyl group is preferred as the alkyl group with 1 to 12 carbon atoms, when considering economy and heat resistance. Examples of the alkenyl group with 2 to 12 carbon atoms preferably include vinyl groups, allyl groups, hexenyl groups, and octenyl groups from the perspective of economy and reactivity, and vinyl groups and hexenyl groups are more preferably used. Furthermore, examples of the aryl group with 6 to 20 carbon atoms preferably include phenyl groups, methyl phenyl groups (tolyl groups), and naphthyl groups from the perspective of economy. Benzyl groups and phenethyl groups are preferably used as the aralkyl group with 7 to 20 carbon atoms. Furthermore, examples of the alkoxy group with 1 to 6 carbon atoms preferably include methoxy groups, ethoxy groups, and n-propoxy groups. Note that at least a fixed amount of all substitution groups on a silicon atom as expressed by $R^1$, $R^2$, and $R^3$ are fluoroalkyl groups, and the other groups are preferably methyl groups, phenyl groups, or hydroxyl groups.

The component (A) of the present invention is preferably an organopolysiloxane that does not substantially contain an alkenyl group with 2 to 12 carbon atoms, from the perspective of controlling the pressure-sensitive adhesion of the cured product. Specifically, the substitution group as expressed by $R^1$, $R^2$, and $R^3$ is the fluoroalkyl group, alkyl group with 1 to 12 carbon atoms, aryl group with 6 to 20 carbon atoms, aralkyl group with 7 to 20 carbon atoms, hydroxyl group, or alkoxy group with 1 to 6 carbon atoms, and all substitution groups of the alkenyl group with 2 to 12 carbon atoms is preferably 1 mol % or less, 0.5 mol % or less, or 0.1 mol % or less, and more preferably, the alkenyl group with 2 to 12 carbon atoms is not included at all. This is because an organopolysiloxane that does not contain these functional groups facilitates functional control as a pressure-sensitive adhesive after curing.

The component (A) of the present invention is a resin organopolysiloxane essentially having $R^3SiO_{3/2}$ units (trifunctional siloxane unit) or $SiO_2$ units (tetrafunctional siloxane unit), and in the average unit formula (I), a, b, c, d are numbers that satisfy 0≤a≤0.5, 0≤b≤0.7, 0≤c≤1, 0≤d≤0.7, 0.3≤c+d≤1, and a+b+c+d=1. In particular, the ratio of the total trifunctional siloxane units and tetrafunctional siloxane units with regard to all siloxane units, in other words, the range of c+d must be 0.30 or higher, preferably 0.40 or higher, 0.50 or higher, or 0.60 or higher, and particularly preferably within a range from 0.65 to 0.99. Furthermore, the component (A) of the present invention preferably has trifunctional siloxane units and tetrafunctional siloxane units, where 0<c≤1 and 0<d≤0.7, and particularly preferably has a fixed amount of trifunctional siloxane units (0.1≤c≤1).

In other words, a, b, c, d are more preferably numbers that satisfy 0≤a≤0.50, 0≤b≤0.50, 0.10≤c≤0.95, 0.05≤d≤0.50, 0.65≤c+d≤0.99, and a+b+c+d=1. In particular, b=0 is possible, and 0.01≤a≤0.50 is possible.

The molecular weight of component (A) of the present invention is not particularly limited, but the weight average molecular weight as measured by gel permeation chromatography is preferably 500 or higher, and more preferably 800 or higher or 1,000 or higher. This is because if the molecular weight is less than the aforementioned lower limit, a cured product obtained by curing the curable organopolysiloxane composition containing a fluoroalkyl group of the present invention may have insufficient adhesion and pressure-sensitive adhesion, and may not function as a pressure-sensitive adhesive.

Component (A) of the present invention may be one type of organopolysiloxane that satisfies the aforementioned requirements or may be a mixture of at least two types of organopolysiloxanes. If at least two types of organopolysiloxanes are used, a mixture thereof is preferably expressed by the aforementioned average unit formula, and the organopolysiloxanes are more preferably organopolysiloxanes expressed by average unit formula (I) that satisfy the aforementioned requirements.

Specific examples of the component (A) of the present invention include: polysiloxanes containing $(Me_3SiO_{1/2})$ units, $(Me_2ViSiO_{1/2})$ units, and $(TfpSiO_{3/2})$ units; polysiloxanes containing $(Me_3SiO_{1/2})$ units, $(Me_2ViSiO_{1/2})$ units, $(PhSiO_{3/2})$ units, and $(TfpSiO_{3/2})$ units; polysiloxanes containing $(Me_3SiO_{1/2})$ units, $(Me_2ViSiO_{1/2})$ units, $(TfpSiO_{3/2})$ units, and $(SiO_{4/2})$ units; polysiloxanes containing $(Me_3SiO_{1/2})$ units, $(TfpSiO_{3/2})$ units, and $(SiO_{4/2})$ units; polysiloxanes containing $(Me_3SiO_{1/2})$ units, $(TfpSiO_{3/2})$ units, and $(PhSiO_{3/2})$ units; polysiloxanes containing $(Me_3SiO_{1/2})$ units, $(TfpSiO_{3/2})$ units, $(PhSiO_{3/2})$ units, and $(SiO_{4/2})$ units; polysiloxanes containing $(Me_3SiO_{1/2})$ units, $(Me_2SiO_{2/2})$ units, $(TfpSiO_{3/2})$ units, and $(SiO_{4/2})$ units; polysiloxanes containing $(Me_2ViSiO_{1/2})$ units, $(Me_2SiO_{2/2})$ units, $(TfpSiO_{3/2})$ units, and $(SiO_{4/2})$ units; polysiloxanes containing $(Me_3SiO_{1/2})$ units, $(TfpSiO_{3/2})$ units, and $(MeSiO_{3/2})$ units; polysiloxanes containing $(Me_3SiO_{1/2})$ units, $(TfpSiO_{3/2})$ units, $(MeSiO_{3/2})$ units, and $(SiO_{4/2})$ units; polysiloxanes containing $(Me_3SiO_{1/2})$ units, $(Me_2SiO_{2/2})$ units, (TfpSiO$_{3/2}$) units, and (MeSiO$_{3/2}$) units; polysiloxanes containing (Me$_3$SiO$_{1/2}$) units, (MePhSiO$_{2/2}$) units, (TfpSiO$_{3/2}$) units, and (SiO$_{4/2}$) units; polysiloxanes containing (Me$_3$SiO$_{1/2}$) units, (MePhSiO$_{2/2}$) units, (TfpSiO$_{3/2}$) units, and (PhSiO$_{3/2}$) units; polysiloxanes containing (Me$_2$ViSiO$_{1/2}$) units, (MePhSiO$_{2/2}$) units, (TfpSiO$_{3/2}$) units, and (SiO$_{4/2}$) units; polysiloxanes containing (Me$_3$SiO$_{1/2}$) units, (MePhSiO$_{2/2}$) units, (TfpSiO$_{3/2}$) units, and (MeSiO$_{3/2}$) units; polysiloxanes containing (Me$_2$PhSiO$_{1/2}$) units, (MePhSiO$_{2/2}$) units, and (TfpSiO$_{3/2}$) units; polysiloxanes containing (Me$_2$PhSiO$_{1/2}$) units, (Me$_2$SiO$_{2/2}$) units, and (TfpSiO$_{3/2}$) units; polysiloxanes containing (Me$_2$PhSiO$_{1/2}$) units, (MePhSiO$_{2/2}$) units, (MeSiO$_{3/2}$) units, and (TfpSiO$_{3/2}$) units; polysiloxanes containing (Me$_2$PhSiO$_{1/2}$) units, (Me$_2$SiO$_{2/2}$) units, (MeSiO$_{3/2}$) units, and (TfpSiO$_{3/2}$) units; polysiloxanes containing (Me$_2$PhSiO$_{1/2}$) units, (MePhSiO$_{2/2}$) units, (TfpSiO$_{3/2}$) units, and (SiO$_{4/2}$) units; polysiloxanes containing (Me$_2$PhSiO$_{1/2}$) units, (Me$_2$SiO$_{2/2}$) units, (TfpSiO$_{3/2}$) units, and (SiO$_{4/2}$) units; polysiloxanes containing (Me$_2$PhSiO$_{1/2}$) units, (TfpSiO$_{3/2}$) units, and (SiO$_{4/2}$) units; polysiloxanes containing (Me$_2$PhSiO$_{1/2}$) units, (TfpSiO$_{3/2}$) units, and (PhSiO$_{3/2}$) units; polysiloxanes containing (Me$_2$PhSiO$_{1/2}$) units, (TfpSiO$_{3/2}$) units, and (MeSiO$_{3/2}$) units; polysiloxanes containing (TfpMe$_2$SiO$_{1/2}$) units, (Me$_2$SiO$_{2/2}$) units, (MeSiO$_{3/2}$) units, and (SiO$_{4/2}$) units; polysiloxanes containing (TfpMe$_2$SiO$_{1/2}$) units, (Me$_2$SiO$_{2/2}$) units, (PhSiO$_{3/2}$) units, and (SiO$_{4/2}$) units; polysiloxanes containing (TfpMe$_2$SiO$_{1/2}$) units, (Me$_2$SiO$_{2/2}$) units, (TfpSiO$_{3/2}$) units, and (SiO$_{4/2}$) units; polysiloxanes containing (TfpMe$_2$SiO$_{1/2}$) units, (MePhSiO$_{2/2}$) units, (MeSiO$_{3/2}$) units, and (SiO$_{4/2}$) units; polysiloxanes containing (TfpMe$_2$SiO$_{1/2}$) units, (MePhSiO$_{2/2}$) units, (PhSiO$_{3/2}$) units, and (SiO$_{4/2}$) units; polysiloxanes containing (TfpMe$_2$SiO$_{1/2}$) units, (MeSiO$_{3/2}$) units, and (SiO$_{4/2}$) units; polysiloxanes containing (TfpMe$_2$SiO$_{1/2}$) units, (PhSiO$_{3/2}$) units, and (SiO$_{4/2}$) units; polysiloxanes containing (TfpMe$_2$SiO$_{1/2}$) units, (Me$_3$SiO$_{1/2}$) units, (Me$_2$SiO$_{2/2}$) units, and (SiO$_{4/2}$) units; polysiloxanes containing (TfpMe$_2$SiO$_{1/2}$) units, (Me$_3$SiO$_{1/2}$) units, (MeSiO$_{3/2}$) units, and (SiO$_{4/2}$) units; polysiloxanes containing (TfpMe$_2$SiO$_{1/2}$) units, (Me$_3$SiO$_{1/2}$) units, (PhSiO$_{3/2}$) units, and (SiO$_{4/2}$) units; polysiloxanes containing (TfpMe$_2$SiO$_{1/2}$) units, (TfpSiO$_{3/2}$) units, and (SiO$_{4/2}$) units; polysiloxanes containing (TfpMe$_2$SiO$_{1/2}$) units, (MeSiO$_{3/2}$) units, and (TfpSiO$_{3/2}$) units; polysiloxanes containing (TfpMe$_2$SiO$_{1/2}$) units, (PhSiO$_{3/2}$) units and (TfpSiO$_{3/2}$) units; polysiloxanes containing (TfpMe$_2$SiO$_{1/2}$) units, (MeSiO$_{3/2}$) units, and (PhSiO$_{3/2}$) units; polysiloxanes containing (TfpMe$_2$SiO$_{1/2}$) units, (MePhSiO$_{2/2}$) units, and (MeSiO$_{3/2}$) units; polysiloxanes containing (TfpMe$_2$SiO$_{1/2}$) units, (MePhSiO$_{2/2}$) units, and (PhSiO$_{3/2}$) units; polysiloxanes containing (Me$_3$SiO$_{1/2}$) units, (MeTfpSiO$_{2/2}$) units, (TfpSiO$_{3/2}$) units, and (SiO$_{4/2}$) units; polysiloxanes containing (Me$_3$SiO$_{1/2}$) units, (MeTfpSiO$_{2/2}$) units, (MeSiO$_{3/2}$) units, and (SiO$_{4/2}$) units; polysiloxanes containing (Me$_3$SiO$_{1/2}$) units, (MeTfpSiO$_{2/2}$), (PhSiO$_{3/2}$) units, and (SiO$_{4/2}$) units; polysiloxanes containing (Me$_3$SiO$_{1/2}$) units, (MeTfpSiO$_{2/2}$) units, (PhSiO$_{3/2}$) units and (SiO$_{4/2}$) units; polysiloxanes containing (Me$_3$SiO$_{1/2}$) units, (MeTfpSiO$_{2/2}$) units, and (SiO$_{4/2}$) units; polysiloxanes containing (Me$_3$SiO$_{1/2}$) units, (MeTfpSiO$_{2/2}$) units, and (MeSiO$_{3/2}$) units; polysiloxanes containing (Me$_3$SiO$_{1/2}$) units, (MeTfpSiO$_{2/2}$) units, and PhSiO$_{3/2}$) units; polysiloxanes containing (Me$_3$SiO$_{1/2}$) units, (MeTfpSiO$_{2/2}$) units, and (TfpSiO$_{3/2}$) units; polysiloxanes containing (Me$_3$SiO$_{1/2}$) units, (MeTfpSiO$_{2/2}$) units, (TfpSiO$_{3/2}$) units, and (MeSiO$_{3/2}$) units; polysiloxanes containing (Me$_3$SiO$_{1/2}$) units, (MeTfpSiO$_{2/2}$) units, (Me$_2$SiO$_{2/2}$) units, and (SiO$_{4/2}$) units; polysiloxanes containing (Me$_3$SiO$_{1/2}$) units, (MeTfpSiO$_{2/2}$) units, (MePhSiO$_{2/2}$) units, and (SiO$_{4/2}$); polysiloxanes containing (TfpMe$_2$SiO$_{1/2}$) units, (MeTfpSiO$_{2/2}$) units, (TfpSiO$_{3/2}$) units, and (SiO$_{4/2}$) units; polysiloxanes containing (TfpMe$_2$SiO$_{1/2}$) units, (MeTfpSiO$_{2/2}$) units, and (TfpSiO$_{3/2}$) units; and the like. Herein, Me represents a methyl group, Ph represents a phenyl group, Vi represents a vinyl group, and Tfp represents a trifluoropropyl group. Note that a polysiloxane that does not contain an alkenyl group such as a vinyl group or the like is preferred from the perspective of controlling pressure-sensitive adhesion.

Component (A) of the present invention is preferably at least one type of organopolysiloxane containing the siloxane units, or a mixture thereof, and particularly preferred examples include an organopolysiloxane as expressed by

$$(Me_3SiO_{1/2})a(TfpSiO_{3/2})c(SiO_{4/2})d$$

Herein, a, c, d are the same numbers as above, and are particularly preferably numbers that satisfy $0.01 \le a \le 0.50$, $0.10 \le c \le 0.95$, $0.05 \le d \le 0.50$, $0.65 \le c+d \le 0.99$, and $a+c+d=1$. Note that a preferred molecular weight thereof is a weight average molecular weight as measured by gel permeation chromatography of 500 or more, and more preferably 800 or more or 1,000 or more.

The amount of the component (A) used (blending amount) in the curable organopolysiloxane composition containing a fluoroalkyl group of the present invention is within a range of 1 to 80 mass % with regard to the sum of components (A) to (D) (total set as 100 mass %), and from the perspective of performance as a pressure-sensitive adhesive, is preferably 10 to 75 mass %, more preferably 20 to 70 mass %, and even more preferably within a range of 25 to 65 mass %. This is because when the amount of the component (A) used is within the aforementioned range, mechanical strength of the cured product formed from curing the present composition is sufficiently high, and the cured product functions as a pressure-sensitive adhesive.

The component (A) of the present invention is manufactured by a conventionally known reaction, at least including hydrolysis and condensation reaction of a mixture of a precursor compound that can form a (R$^1_3$SiO$_{1/2}$) unit, a precursor compound that can form (R$^2_2$SiO) unit, a precursor compound that can form (R$^3$SiO$_{3/2}$) unit, and a precursor compound that can form a (SiO$_2$) unit, in the presence or absence of an acid, basic compound, or both.

Examples of a precursor compound that can form a (R$^1_3$SiO$_{1/2}$) unit include, R$^1_3$SiCl, (R$^1_3$Si)$_2$O, and R$^1_3$SiOMe. Herein, Me represents a methyl group. Examples of a precursor compound that can form a (R$^2_2$SiO) unit include R$^2_2$SiCl$_2$, R$^2_2$Si(OMe)$_2$, HO(R$^2_2$SiO)$_n$H, and (R$^2_2$SiO)$_x$ [x represents an integer from 3 to 8]. Furthermore, examples a precursor compound that can form a (R$^3$SiO$_{3/2}$) unit include R$^3$SiCl$_3$ and R$^3$Si(OMe)$_3$. Furthermore, examples of a precursor compound that can form a (SiO$_2$) unit include SiCl$_4$, Si(OMe)$_4$, Si(OEt)$_4$, and partially hydrolyzed condensates of tetraalkoxysilanes thereof. Herein, Et represents an ethyl group.

A hydrolysis reaction may be performed in the presence of a strong acid catalyst such as hydrochloric acid, sulfuric acid, trifluoroacetic acid, p-toluene sulfonic acid, trifluoromethane sulfonic acid, or the like for example. The reaction temperature of the hydrolysis is preferably −10 to 100° C., and more preferably 20 to 80° C. At this time, a condensation reaction normally simultaneously advances. In order to smoothly advance the condensation reaction, the reaction can be performed while removing by-products (such as alcohol, hydrogen halides, and the like) generated during the aforementioned hydrolysis out of the reaction system. Furthermore, a basic compound can be added to the reaction mixture in the middle of the condensation reaction to make the inside of the reaction system basic, and therefore, the condensation reaction can be further advanced. Examples of the basic compound at this time include sodium hydroxide, potassium hydroxide, cesium hydroxide, and the like.

After completing the condensation reaction, adding a basic compound or acidic compound is recommended in order to neutralize the reaction system. If the inside of the reaction system is acidic, potassium hydroxide, sodium hydrogen carbonate, sodium carbonate, and potassium carbonate, and other basic inorganic salts, triethylamine, tributylamine, ammonia, pyridine, and other organic bases can be used for example. The amount of the basic compound used is preferably no less than the neutralization equivalent. On the other hand, if the inside of the reaction system is basic, acetic acid, formic acid, citric acid, phosphoric acid, oxalic acid, carbon dioxide gas, dry ice, and the like can be used to neutralize the inside of the reaction system. Salts generated from the neutralizing step can be easily removed by a filtering operation or extracting operation between an organic phase and water phase.

[Component (B)]

Component (B) is a straight chain organopolysiloxane as expressed by average unit formula (II), having a fluoroalkyl group of a constant amount or more, having at least two alkenyl groups, and having a specific molecular chain length. Component (B) has a fixed amount of fluoroalkyl groups, and therefore has excellent affinity with component (A) having the same fluoroalkyl groups, excellent transparency, and a relatively high specific permittivity. Furthermore, the component (B) has at least two alkenyl groups in a molecule, and provides a cured product with excellent moldability, reaction controllability, and transparency by crosslinking by an addition reaction (hydrosilylation reaction) with component (C).

Specifically, average unit formula:

$$R^4{}_3Si(OSiR^4{}_2)_eOSiR^4{}_3 \quad (II)$$

In the formula, 5 mol % or more, preferably 10 mol % or more, and more preferably 15 mol % or more of all substitution groups on the silicon atom as represented by $R^4$ are fluoroalkyl groups as expressed by $C_pF_{2+1}$—R— (R represents an alkylene group with 1 to 5 carbon atoms, and p represents an integer from 1 to 8). Herein, preferred examples and types of the fluoroalkyl groups are the same as the fluoroalkyl groups in component (A), and a trifluoropropyl group is most preferable. When the amount of the fluoroalkyl groups is less than the lower limit, the affinity with the component (A) is reduced, and the transparency and specific permittivity of a cured product obtained by curing the curable organopolysiloxane composition are reduced, and therefore this is inappropriate.

Substitution groups as expressed by $R^4$ are the same or different fluoroalkyl groups, alkyl groups with 1 to 12 carbon atoms, alkenyl groups with 2 to 12 carbon atoms, aryl groups with 6 to 20 carbon atoms, aralkyl groups with 7 to 20 carbon atoms, hydroxyl group, or alkoxy groups with 1 to 6 carbon atoms, and examples include the same as described above. Herein, in order to provide practical mechanical strength to a cured product obtained by curing the curable organopolysiloxane composition of the present invention, at least two alkenyl groups with 2 to 12 carbon atoms are used. From the perspective of economy and reactivity, an allyl group, hexenyl group, an octenyl group are preferably used, and a vinyl or hexenyl group is more preferably used. In other words, a fixed amount or more of all substitution groups on the silicon atom as represented by $R^4$ are the aforementioned fluoroalkyl groups, where at least two are alkenyl groups with 2 to 12 carbon atoms, and groups other than these are the aforementioned alkyl groups or the like. Preferably, the amount of the alkenyl groups with 2 to 12 carbon atoms in the component (B) may be 0.01 to 1.00 mass % and 0.02 to 0.25 mass %, and groups other than the fluoroalkyl groups and the alkenyl groups with 2 to 12 carbon atoms are preferably methyl groups, phenyl groups, or hydroxyl groups.

In the formula, the value of e is a number that satisfies 5<e<100,000, preferably 20<e<10,000, and more preferably 25<e<5,000. When the value of e is outside of the range, the molding processability of the obtained curable organopolysiloxane composition may deteriorate and the mechanical strength of an obtained cured product may be insufficient. The degree of polymerization of the organopolysiloxane of component (B) can be determined by the ratio of the integrated peak intensity using 29Si-NMR.

The component (B) of the present invention may be one type of organopolysiloxane that satisfies the aforementioned requirements or may be a mixture of at least two types of organopolysiloxanes. If at least two types of organopolysiloxanes are used, a mixture thereof is preferably expressed by the aforementioned average unit formula, and the organopolysiloxanes are more preferably organopolysiloxane as expressed by an average unit formula (II) that satisfies the aforementioned requirements.

Specific examples of the component (B) of the present invention include double-terminated trimethsilyl-polydimethylmethyl vinylmethyl trifluoropropylsiloxane copolymers, double-terminated trimethylsilyl-polymethyl vinylmethyl trifluoropropylsiloxane copolymers, double-terminated dimethylvinylsilyl-polydimethyl methylvinylmethyl trifluoropropylsiloxane copolymers, double-terminated dimethylvinylsilyl-polydimethylmethyl trifluoropropylsiloxane copolymers, double-terminated hydroxydimethylsilyl-polymethylvinylmethyl trifluoropropylsiloxane copolymers, double-terminated hydroxydimethylsilyl-polydimethylmethyl vinylmethyl trifluoropropylsiloxane copolymers, double-terminated dimethylphenylsilyl-polymethyl vinylmethyl trifluoropropylsiloxane copolymers, double-terminated dimethylphenylsilyl-polydimethylmethyl vinylmethyl trifluoropropylsiloxane copolymers, double-terminated dimethylvinylsilyl-polydimethylmethyl vinylmethyl phenylmethyl trifluoropropylsiloxane copolymers, double-terminated dimethylvinylsilyl-polymethyl phenylmethyl trifluoropropylsiloxane copolymers, double-terminated dimethylvinylsilyl-polydimethylmethyl phenylmethyl trifluoropropylsiloxane copolymers, double-terminated hydroxydimethylsilyl-polymethyl vinylmethyl phenylmethyl trifluoropropylsiloxane copolymers, double-terminated hydroxydimethylsilyl-polydimethylmethyl vinylmethyl phenylmethyl trifluoropropylsiloxane copolymers, double-terminated dimethylvinylsilyl-polymethyl trifluoropropylsiloxane, and the like.

Component (B) of the present invention is manufactured by a normal conventionally known reaction, in other words, a reaction including hydrolysis and a condensation reaction, a reaction including ring-opening and polymerization end-termination, or a reaction combining these reactions, of a mixture of a precursor compound that can form a $(R^1{}_3SiO_{1/2})$ unit and a precursor compound that can form a $(R^1{}_2SiO)$ unit, in the presence or absence of an acid, basic compound, or both.

Examples of a precursor compound that can form a $(R^1_3SiO_{1/2})$ unit include, $R^1_3SiCl$, $(R^1_3Si)_2O$, and $R^1_3SiOMe$. Herein, Me represents a methyl group. Examples of a precursor compound that can form a $(R^1_2SiO)$ unit include $R^1_2SiCl_2$, $R^1_2Si(OMe)_2$, $HO(R^1_2SiO)_nH$, and $(R^1_2SiO)_x$ [x represents an integer from 3 to 8].

The component (B) in the composition of the present invention is a main agent of the curable composition, and the amount used is an amount 20 to 99 mass %, preferably 30 to 80 mass %, and more preferably 40 to 70 mass % with regard to the sum (total set to 100 mass %) of components (A) to (D). This is because when the amount is below the upper limit of the aforementioned range, the mechanical strength of a cured product formed by curing the present composition sufficiently increases, and when the amount is above the lower limit of the aforementioned range, the cured product functions as a pressure-sensitive adhesive.

[Component (C)]

Component (C) is a crosslinking agent of the composition of the present invention, and is an organohydrogen polysiloxane having at least two silicon-bonded hydrogen atom in a molecule. The organohydrogen polysiloxane may or may not have a fluorine atom, but is preferably an organohydrogen polysiloxane having a group containing a fluorine.

The molecular structure of the organohydrogen polysiloxane of the component (C) is not particularly limited, and may be a straight chain, cyclic, resin, or straight chain having a partial branch, or may have a T unit (in other words, $YSiO_{3/2}$, where Y is a silicon-bonded hydrogen atom, monovalent organic group (including an organic group containing a fluorine atom), hydroxyl group, or alkoxy group) or a Q unit (in other words, $SiO_{4/2}$). Furthermore, the viscosity is also not particularly limited, and from the perspective of ease of handling, the viscosity at 25° C. is preferably within a range of 1 to 100,000 mPa·s when measured using a B type viscometer in accordance with JIS K7117-1. From the perspective of ease of mixing with the component (A) and component (B), the component is preferably a liquid at ambient temperature, and an organohydrogen polysiloxane with 2 to 300 silicon atoms is particularly preferable.

The siloxane units having a silicon-bonded hydrogen atom are also not limited, and may be any of $(R_2HSiO_{1/2})$ units, $(RHSiO_{2/2})$ units, or $(HSiO_{3/2})$ units, but at least two silicon-bonded hydrogen atoms must by present in a molecule. Herein, R represents the same or different alkyl group with 1 to 12 carbon atoms, aryl group with 6 to 20 carbon atoms, aralkyl group with 7 to 20 carbon atoms, hydroxyl group, alkoxy group with 1 to 6 carbon atoms, or fluoroalkyl group as expressed by $(C_pF_{2p+1})$—R— (where R represents the same groups as above, and p represents the same numbers above), which can be used in the organopolysiloxane (A).

The organohydrogen polysiloxane as component (C) has in a molecule a group containing a fluorine atom, preferably the aforementioned fluoroalkyl group, and particularly preferably a trifluoropropyl group, from the perspective of affinity between the component (A) and component (B) and improving the specific permittivity of a cured product obtained by curing the curable composition of the present invention. The amount of the fluoroalkyl groups is not particularly limited, but 5 to 75 mol % of an organic group containing a fluorine atom, more preferably 10 to 70 mol %, and even more preferably 20 to 60 mol % is provided in a molecule with regard to all of the organic bases.

Preferred examples of component (C) include resin organopolysiloxanes containing an M unit (in other words, $R^6_3SiO_{1/2}$) and T unit ($R^6SiO_{3/2}$), linear organopolysiloxanes containing an M unit and D unit ($R^6_2SiO_{2/2}$), and resin organopolysiloxanes containing an M unit, D unit, and T unit or Q unit. Examples of the organopolysiloxanes containing an M unit and T unit include organopolysiloxanes where a portion or all $R^6$s in the M units are hydrogen atoms, and a portion or all $R^6$s in the T unit are organic groups containing a fluorine atom, such as an organopolysiloxane having a 3,3,3-trifluoropropyl group for example. Examples of the organopolysiloxanes containing an M unit and D unit include organopolysiloxanes where at least a portion of $R^6$s in the M unit are hydrogen atoms, and a portion or all of the $R^6$ in the D unit are the aforementioned fluoroalkyl groups, and a particular example includes an organopolysiloxane having a 3,3,3-trifluoropropyl group. Examples of the organopolysiloxanes containing an M unit, D unit, and T unit include organopolysiloxanes where a portion or all $R^6$s in the M unit are hydrogen atoms, and a portion or all $R^1$s in the D unit and T unit are the aforementioned fluoroalkyl groups, such as a 3,3,3-trifluoropropyl group for example.

Specific examples include double-terminated trimethylsilyl-polydimethylmethyl hydrogen siloxane copolymers, double-terminated trimethylsilyl-polymethyl hydrogen siloxanes, double-terminated trimethylsilyl-polydimethylmethyl hydrogen methyl trifluoropropyl siloxane copolymers, double-terminated trimethylsilyl-polymethyl hydrogen methyl trifluoropropyl siloxane copolymers, double-terminated dimethyl hydrogensilyl-polydimethylmethyl hydrogen siloxane copolymers, double-terminated dimethyl hydrogensilyl-polydimethyl siloxanes, double-terminated dimethyl hydrogensilyl-polydimethylmethyl trifluoropropyl siloxane copolymers, double-terminated dimethyl hydrogensilyl-polymethyl hydrogen methyl trifluoropropyl siloxane copolymers, double-terminated dimethyl hydrogensilyl-polydimethylmethyl hydrogen methyl trifluoropropyl siloxane copolymers, double-terminated dimethyl hydrogensilyl-polymethyl trifluoropropyl siloxanes, double-terminated hydroxy dimethylsilyl-polymethyl hydrogen siloxanes, double-terminated hydroxy dimethylsilyl-polymethyl hydrogen methyl trifluoropropyl siloxane copolymers, double-terminated hydroxy dimethylsilyl-polydimethylmethyl hydrogen methyl trifluoropropyl siloxane copolymers, double-terminated dimethyl phenylsilyl-polymethyl hydrogen siloxanes, double-terminated dimethyl phenylsilyl-polymethyl hydrogen methyl trifluoropropyl siloxane copolymers, double-terminated dimethyl phenylsilyl-polydimethylmethyl hydrogen methyl trifluoropropyl siloxane copolymers, double-terminated dimethyl hydrogensilyl-polydimethyl methylphenyl siloxane copolymers, double-terminated dimethyl hydrogensilyl-polydimethyl methylphenylmethyl trifluoropropyl siloxane copolymers, double-terminated dimethyl hydrogensilyl-polymethyl phenylmethyl trifluoropropyl siloxane copolymers, double-terminated hydroxy dimethylsilyl-polymethyl hydrogen methylphenyl siloxane copolymers, double-terminated hydroxy dimethylsilyl-polymethyl hydrogen methylphenylmethyl trifluoropropyl siloxane copolymers, double-terminated dimethyl trifluoropropylsilyl-polydimethylmethyl hydrogen siloxane copolymers, double-terminated dimethyl trifluoropropylsilyl-polymethyl hydrogen siloxanes, dimethylmethyl hydrogen cyclopolysiloxanes, methyl hydrogen cyclopolysiloxanes, methyl hydrogen methyl trifluoropropyl cylcopolysiloxanes, dimethylmethyl hydrogen methyl trifluoropropyl cyclopolysiloxanes, methylphenylmethyl hydrogen methyl trifluoropropyl cyclopolysiloxanes, 1,1,3,5,5-pentamethyl-3-trifluoropropyl trisiloxanes, tris (dimethyl siloxysilyl) trifluoropropylsilanes, polysiloxanes containing $(Me_3SiO_{1/2})$ units, $(Me_2HSiO_{1/2})$ units, and $(SiO_{4/2})$ units, polysiloxanes containing (Me$_2$HSiO$_{1/2}$) units and (SiO$_{4/2}$) units, polysiloxanes containing a (Me$_3$SiO$_{1/2}$) units, (Me$_2$HSiO$_{1/2}$) units, and (TfpSiO$_{3/2}$) units, polysiloxanes containing (Me$_2$HSiO$_{1/2}$) units and (TfpSiO$_{3/2}$) units, polysiloxanes containing (Me$_3$SiO$_{1/2}$) units, (MeHSiO$_{2/2}$) units, and (TfpSiO$_{3/2}$) units, polysiloxanes containing (Me$_2$HSiO$_{1/2}$) units, (MeHSiO$_{2/2}$) units, and (TfpSiO$_{3/2}$) units, polysiloxanes containing (Me$_2$HSiO$_{1/2}$) units, (TfpSiO$_{3/2}$) units, and (MeSiO$_{3/2}$) units, polysiloxanes containing (Me$_2$HSiO$_{1/2}$) units, (TfpSiO$_{3/2}$) units, and (PhSiO$_{3/2}$) units, polysiloxanes containing (Me$_2$HSiO$_{1/2}$) units and (PhSiO$_{3/2}$) units, polysiloxanes containing (Me$_2$HSiO$_{1/2}$) units, (TfpSiO$_{3/2}$) units, and (SiO$_{4/2}$) units, and the like. These can be used independently or may be a mixture of at least two organopolysiloxanes. Herein, Me represents a methyl group, Ph represents a phenyl group, and Tfp represents a trifluoropropyl group.

Component (C) is preferably a resin organohydrogen polysiloxane, and examples thereof include resin organohydrogen polysiloxanes containing (Me$_2$HSiO$_{1/2}$) units and (TfpSiO$_{3/2}$) units and resin organohydrogen polysiloxanes containing (Me$_2$HSiO$_{1/2}$) units and (SiO$_{4/2}$) units. The molar ratio of the (Me$_2$HSiO$_{1/2}$) units with regard to the (TfpSiO$_{3/2}$) units or (SiO$_{4/2}$) units is particularly preferably within a range of 1.0 to 2.0.

Component (C) of the present invention can be manufactured by a conventionally known manufacturing method such as a reaction including ring-opening polymerization or a reaction at least including hydrolysis and a condensation reaction, of alkoxy silanes, chlorosilanes, or siloxanes having an organic group containing or not containing a fluorine atom and/or reactive functional group, in the presence or absence of an acid, basic compound, or both. In particular, component (C) having a fluoroalkyl group can be manufactured by a method including a ring-opening polymerization reaction or method at least including hydrolysis and a condensation reaction using alkoxysilanes having a fluoroalkyl group as raw material.

The amount of component (C) used in the composition of the present invention is an amount where the amount of silicon-bonded hydrogen atoms in the present component is 0.1 to 40 mols with regard to 1 mol of the total amount of alkenyl groups in the component (A) and component (B). When the amount of component (C) used is outside of the aforementioned range, curing of the present composition may be insufficient, and the mechanical strength of a cured product after curing may be reduced. A preferred amount of component (C) that is used is dependent on the molecular weight of the component (B), but is an amount where the silicon-bonded hydrogen atoms in the present component is 0.5 to 20 mols with regard to 1 mol of the total amount of alkenyl groups in component (A) and component (B). As the molecular weight of the component (B) increases, the preferred amount used of component (C) tends to increase. If the component (A) does not contain an alkenyl group and the degree of polymerization e of component (B) is within a range of 100 to 1000, component (C) is preferably within a range where the silicon-bonded hydrogen atoms in the present component is 0.5 to 5.0, and particularly preferably within a range of 0.5 to 3.0, with regard to 1 mol of the total amount of the alkenyl groups in the component (B).

[Component (D)]

A hydrosilylation reaction catalyst which is component (D) is not limited to a specific catalyst, so long as a hydrosilylation reaction can be promoted. Many metals and compounds are known thus far as hydrosilylation reaction catalysts, which can be appropriately selected and used in the present invention. Specific examples of the hydrosilylation reaction catalyst can include fine particulate platinum adsorbed on silica fine powder or a carbon powder carrier, chloroplatinic acids, alcohol-modified chloroplatinic acids, olefin complexes of a chloroplatinic acid, coordinate compounds of a chloroplatinic acid and vinyl siloxane, platinum black, palladium, and rhodium catalysts.

The amount of the hydrosilylation reaction catalyst used is not particularly limited, so long as the amount is an effective amount and an amount that promotes curing of the curable organopolysiloxane composition of the present invention. Specifically, the amount of metal atoms in the catalyst is 0.01 to 1,000 ppm by mass with regard to the sum (total amount set to 100 mass %) of components (A) to (D), and preferably, the amount of platinum metal atoms in component (D) is within a range of 0.1 to 500 ppm. This is because when the amount of the component (D) is less than the lower limit of the aforementioned range, curing may be insufficient, and when the amount exceeds the upper limit of the aforementioned range, coloring or the like and transparency of an obtained cured product may be adversely affected in addition to being uneconomical.

[Solvent (E)]

The curable organopolysiloxane composition containing a fluoroalkyl group of the present invention can be provided as is to a curing reaction, but on the other hand, if the composition is in a solid form or viscous liquid form, miscibility and handling is improved, and therefore, an organic solvent can be used if necessary. In particular, if the curable organopolysiloxane composition containing a fluoroalkyl group of the present invention is coated in a film form, the viscosity is preferably adjusted using a solvent within a range where the entire viscosity is 100 to 100,000 mPa·s, and if diluting with a solvent, the solvent can be used within a range of 0 to 2000 parts by mass with regard to the sum (100 parts by mass) of the components (A) to (D). In other words, in the present invention composition, solvent (E) may be 0 parts by mass.

So long as the organic solvent used herein is a compound that can dissolve a portion of components or all components in the composition, the type is not particularly limited, and a solvent with a boiling point from 80° C. to 200° C. is preferably used. Examples include i-propyl alcohols, t-butyl alcohols, cyclohexanols, cyclohexanones, methyl ethyl ketones, methyl isobutyl ketones, toluenes, xylenes, mesitylenes, 1,4-dioxanes, dibutyl ethers, anisoles, 4-methyl anisoles, ethyl benzenes, ethoxy benzenes, ethylene glycols, ethylene glycol dimethyl ethers, ethylene glycol diethyl ethers, 2-methoxy ethanols (ethylene glycol monomethyl ethers), diethylene glycol dimethyl ethers, diethylene glycol monomethyl ethers, 1-methoxy-2-propyl acetates, 1-ethoxy-2-propyl acetates, octamethyl cyclotetrasiloxanes, hexamethyl disiloxanes, and other non-halogen solvents, trifluoromethyl benzenes, 1,2-bis (trifluoromethyl) benzenes, 1,3-bis (trifluoromethyl) benzenes, 1,4-bis (trifluoromethyl) benzenes, trifluoromethyl chlorobenzenes, trifluoromethyl fluorobenzenes, hydrofluoroethers, and other halogen solvents. The organic solvent can be used independently or as a mixture of two or more types thereof. As the amount of fluoroalkyl groups in the curable composition increases, the usage ratio of the halogen solvents must increase.

The amount of the organic solvent used herein is preferably within a range of 0 to 2,000 parts by mass, and more preferably 5 to 500 or 10 to 300 parts by mass when the sum of the component (A) to (D) is set to 100 parts by mass.

The viscosity at 25° C. of the present composition is not particularly limited, but is preferably with a range of 100 to 100,000 mPa·s, more preferably 300 to 10,000 mPa·s, and particularly preferably within a range of 1,000 to 8,000 mPa·s. The amount of the organic solvent used can be adjusted in order to set to a preferred viscosity range.

In addition to the aforementioned components, components other than those described above can be added and mixed if necessary to the curable organopolysiloxane composition containing a fluoroalkyl group of the present invention, so long as an object of the present invention is not impaired. Examples of other components include hydrosilylation reaction suppressants, adhesion improving agents, heat resistance improving agents, fillers, pigments, and other conventionally known various additives. For example, an inorganic filler can be added in order to adjust the entire viscosity or to improve functionality such as improving dielectric properties or the like.

The hydrosilylation reaction suppressant is added in order to suppress a crosslinking reaction that occurs between the components (A), (B), and (C), extend the usable time at ambient temperature, and improve the storage stability. Therefore, for the curable composition of the present invention, the suppressant is a component that is inevitably added in practice.

Examples of the hydrosilylation reaction suppressant include acetylene compounds, enyne compounds, organic nitrogen compounds, organic phosphorus compounds, and oxime compounds. Specific examples include: 3-methyl-1-butyne-3-ol, 3,5-dimethyl-1-hexyne-3-ol, 3-methyl-1-pentyne-3-ol, 1-ethynyl-1-cyclohexanol, phenyl butynol, and other alkyne alcohols; 3-methyl-3-pentene-1-yne, 3,5-dimethyl-1-hexyne-3-yne, and other enyne compounds; 1,3,5,7-tetramethyl-1,3,5,7-tetravinyl cyclotetrasiloxane, 1,3,5,7-tetramethyl-1,3,5,7-tetrahexenyl cyclotetrasiloxane, and other methyl alkenyl cyclosiloxanes; and benzotriazoles.

The blending amount of the hydrosilylation reaction suppressant is an effective amount for extending the usable time of the curable organopolysiloxane composition of the present invention at ambient temperature, and improving storage stability. Normally, the amount is within a range of 0.001 to 5 mass %, and preferably within a range of 0.01 to 2 mass % per 100 mass % of the component (A), but may be appropriately selected based on the type of the present component, amount and performance of a platinum catalyst, amount of alkenyl groups in the component (A) and component (B), amount of silicon-bonded hydrogen atoms in the component (C), and the like.

The adhesion improving agent improves adhesion to a substrate which the curable organopolysiloxane composition containing a fluoroalkyl group of the present invention contacts during curing. The additive is effective for when a sheet or pressure-sensitive adhesive tape having a pressure-sensitive adhesive layer which is a cured product of the composition is not repeeled. Examples of the adhesion improving agent include vinyl triethoxysilanes, allyl trimethoxysilanes, allyl triethoxysilanes, 3-glycidoxypropyl trimethoxysilanes, 3-methacryloxypropyl trimethoxysilanes, and other organic functional alkoxysilane compounds, and siloxane derivatives thereof.

Examples of other arbitrary components included: phenolic-based, quinone-based, amine-based, phosphorus-based, phosphite-based, sulfur-based, thioether-based antioxidants, and other antioxidants; triazole-based, benzophenone-based light stabilizers, and other light stabilizers; phosphate ester-based halogen-based, phosphorus-based, antimony-based, flame retardants, and other flame retardants; antistatic agents containing at least one type of cationic surfactant, anionic surfactant, nonionic surfactant; dyes and pigments; and the like, so long as the technical effects of the present invention are not impaired.

In the composition according to the present invention, the filler may be used or not used as desired. If a filler is used, an inorganic filler, organic filler, or both can be used. The type of filler to be used in not particularly limited, and examples include high dielectric fillers, conductive fillers, insulating fillers, and reinforcing fillers, where one or more type thereof can be used. In particular, the composition of the present invention can contain at least one type of filler selected from a group consisting of high dielectric fillers, conductive fillers, insulating fillers, and reinforcing fillers in order to adjust the viscosity or provide functionality, within a range that does not impair the transparency, coatability, and handling workability thereof. A portion of or all fillers may be surface treated by at least one type of surface treating agent.

The filler may be one type or two or more types, and the shape thereof is not particularly limited, and can be particulate, plate-shaped, needle-shaped, fibrous, or other arbitrary shape. If the filler shape is particulate, the particle size of the filler is not particularly limited, but the volume average particle size thereof can be within a range of 0.001 to 500 μm when measured by a laser light diffracting method. Furthermore, the volume average particle size of the filler can be 300 μm or less, 200 μm or less, 100 μm or less, 10 μm or less and 0.01 μm or more, 0.1 μm or more, and 1 μm or more, based on the purpose for using the filler. If the shape of the filler is anisotropic such as a plate shape, needle shape, fibrous shape, or the like, the aspect ratio of the filler can be 1.5 or higher, 5 or higher, or 10 or higher. When using fine particles with volume average particle size of 0.01 μm or less and maximum particle size of 0.02 μm or less, a cured product, and particularly a pressure-sensitive adhesive film with substantially high transparency can be manufactured.

The curable organopolysiloxane composition containing a fluoroalkyl group of the present invention can be prepared by uniformly mixing the components (A) to (D), and adding another arbitrary component, if necessary, and then uniformly mixing. Various stirrers or kneaders are preferably used to mix at ambient temperature, but if the combination of components do not cure during mixing, mixing under heat may be performed.

The blending order of the components is not particularly limited so long as curing does not occur during mixing. When not immediately used after mixing, the components are preferably stored separately in a plurality of containers such that the component (C) and component (D) are not present in the same container, and then the components in all containers are mixed immediately before use.

A curing reaction of the curable organopolysiloxane composition containing a fluoroalkyl group of the present invention is normally achieved by exposing the composition to heat or active energy rays. The heat curing reaction temperature is not particularly limited, but is preferably 50° C. to 200° C., more preferably 60° C. to 200° C., and even more preferably 80° C. to 180° C. Furthermore, the time of the curing reaction is dependent on the structures of the component (A), (B), and (C), but is normally 1 second to 3 hours. In general, a cured product can be obtained by maintaining for 10 seconds to 30 minutes within a range of 90 to 180° C.

Examples of the active energy rays that can be used in a curing reaction include ultraviolet rays, electron beams, radiation, and the like, but ultraviolet rays are preferred from the perspective of practicality. If a curing reaction is performed using ultraviolet rays, a hydrosilylation reaction catalyst having high activity with regard to the ultraviolet rays that are used, such as bis(2,4-pentanedionato) platinum complexes and (methylcyclopentadienyl) trimethyl platinum complexes, is preferably added. High-pressure mercury lamps, medium-pressure mercury lamps, Xe—Hg lamps, deep UV lamps, and the like are preferred as the generation source of ultraviolet rays, and the amount of irradiation thereof at this time is preferably 100 to 8,000 mJ/cm$^2$.

The cured product of the present invention is formed by curing the aforementioned curable organopolysiloxane composition containing a fluoroalkyl group. The shape of the cured product is not particularly limited, and examples include a sheet shape, a film shape, and tape shape.

[Use as Pressure-Sensitive Adhesive Layer]

A cured product of the present invention can be particularly used as a substantially transparent pressure-sensitive adhesive layer. Herein, substantially transparent means that a film-shaped cured product with a thickness of 10 to 1000 µm is visually transparent, and a light transmittance at a 450 nm wavelength is generally 80% or higher if the air value is set at 100%.

The curable organopolysiloxane composition containing a fluoroalkyl group according to the present invention can be coated on a film-shaped substrate, tape-shaped substrate, or sheet-shaped substrate (hereinafter, referred to as "film-shaped substrate"), and the cured by heating under the aforementioned temperature conditions to form a pressure-sensitive adhesive layer on a surface of the substrate. A cured layer, and particularly a laminate body provided with a film-shaped pressure-sensitive adhesive layer, formed by curing the curable organopolysiloxane composition containing a fluoroalkyl group according to the present invention on the film-shaped substrates may be used pressure-sensitive adhesive tapes, bandages, low-temperature supporting bodies, transfer films, labels, emblems, and signs for decorations and descriptions. Furthermore, the cured layer formed by curing the curable organopolysiloxane composition containing a fluoroalkyl group according to the present invention may be used for assembling automobile parts, toys, electronic circuits, or keyboards. Alternatively, the cured layer, and particularly a film-shaped pressure-sensitive adhesive layer, formed by curing the curable organopolysiloxane composition containing a fluoroalkyl group according to the present invention may be used to construct and use a laminated touch screen or flat panel display.

Examples of the type of substrate include paper, cardboard paper, clay coated paper, polyolefin laminate paper, and particularly polyethylene laminate paper, synthetic resin films/sheets, natural fibrous materials, synthetic fibrous materials, artificial leather materials, and metal foils. Synthetic resin films/sheets are particularly preferred, and examples of synthetic resins include polyimides, polyethylenes, polypropylenes, polystyrenes, polyvinyl chlorides, polyvinylidene chlorides, polycarbonates, polyethylene terephthalates, and nylons. In particular, if heat resistance is required, a film of a polyimide polyether ether ketone, polyethylene naphthalate (PEN), liquid crystal polyacrylate, polyamide imide, polyether sulfone, and other heat resistant synthetic resins are preferred. On the other hand, for an application in which visibility of the display device or the like is required, a transparent material, and specifically polypropylene, polystyrene, polyvinylidene chloride, polycarbonate, polyethylene terephthalate, PEN, and other transparent materials are preferred.

The substrate is preferably film-shaped or sheet-shaped. The thickness thereof is not particularly limited, but is normally approximately 5 to 300 µm. Furthermore, in order to improve bonding between a supporting film and the pressure-sensitive adhesive layer, a primer treated, corona treated, etched, or plasma treated supporting film may be used. Furthermore, an opposite surface from the pressure-sensitive adhesive surface of the film-shaped substrate may be surface treated with a treatment that provides scratch resistance, grime resistance, fingerprint attachment resistance, antiglare, antireflection, antistatic, and other properties, or the like.

Examples of the method of coating onto a substrate include gravure coating, offset coating, offset gravure coating, roller coating using an offset transfer roller coater or the like, reverse roller coating, air knife coating, curtain coating using a curtain flow coater or the like, comma coating, Meyer bar coating, and other methods used for forming a conventionally known cured layer, which can be used without limitation.

The coating amount is set based on the application, but in particular, if the layer is used as a dielectric layer and transparency pressure-sensitive adhesive layer, the thickness of the pressure-sensitive adhesive layer after curing may be 1 to 1,000 µm, 20 to 900 µm, or 100 to 800 µm.

If the cured layer formed by curing the curable organopolysiloxane composition containing a fluoroalkyl group of the present invention is a pressure-sensitive adhesive layer, and particularly a substantially transparent pressure-sensitive adhesive film, the cured layer is preferably handled as a laminate body film adhered in a peelable condition on a film substrate provided with a peeling layer having peeling coating performance.

The cured product formed by curing the curable organopolysiloxane composition containing a fluoroalkyl group of the present invention if useful as an electronic material, member for a display device, or member for a transducer (including for sensors, speakers, actuators, and generators), and a preferred application for the cured product is an electronic component or display device member. In particular, a film-shaped cured product, and particularly a substantially transparent pressure-sensitive adhesive film is preferred as a display panel or member for a display, and is particularly useful as so-called touch panel application that can operate an apparatus, and particularly an electronic apparatus by touching a screen with a finger or the like.

[Touch Panel or Member for Display]

The cured product of the curable organopolysiloxane composition containing a fluoroalkyl group of the present invention can be used to construct or use a laminate touch screen or flat panel display, and a conventionally known method of using a pressure-sensitive adhesive layer (and particularly a silicone PSA) can be used without particular limitation as a specific use method.

For example, the cured product formed by curing the curable organopolysiloxane composition containing a fluoroalkyl group can be used for manufacturing a display device such as a touch panel or the like as a pressure-sensitive adhesive layer or optically transparent silicone pressure-sensitive adhesive disclosed in the aforementioned Japanese PCT Patent Application 2014-522436 (Patent Literature 9), Japanese PCT Patent Application (2013-512326) (Patent Literature 10), and the like. For example, the cured product formed by curing the curable organopolysiloxane composition containing a fluoroalkyl group of the present invention can be used as the pressure-sensitive adhesive layer or pressure-sensitive adhesive film described in Patent Literature 10 without particular limitation.

As one example, a touch panel according to the present invention may be a touch panel including a cured layer formed by curing the curable organopolysiloxane composition of the present invention, adhered to a substrate such as a conductive plastic film or the like on which a conductive layer is formed on one surface, and to a surface on a side or opposite side from which the conductive layer is formed. The substrate if preferably a sheet-shaped or film-shaped substrate, and examples include resin films and glass plates. Furthermore, the conductive plastic film may be a resin film or glass plate, and particularly a polyethylene terephthalate, on which an ITO layer is formed on one surface. These are disclosed in the aforementioned Japanese PCT Patent Application 2013-512326 (Patent Literature 10) and the like.

Furthermore, the cured product formed by curing the curable organopolysiloxane composition containing a fluoroalkyl group of the present invention may be used as an adhesive film for a polarizing plate used in manufacturing a display device such as a touch panel or the like, or may be used as a pressure-sensitive adhesive layer used in lamination between a display module and touch panel described in Japanese Unexamined Patent Application Publication No. 2013-065009.

INDUSTRIAL APPLICABILITY

An application of the curable organopolysiloxane composition containing a fluoroalkyl group of the present invention and cured product formed by curing the composition are not limited in any way except as described above, and a pressure-sensitive adhesive film provided with a cured product formed by curing the curable organopolysiloxane composition containing a fluoroalkyl group of the present invention can be used in television receivers, computer monitors, portable information terminal monitors, observation monitors, video cameras, digital cameras, cellular phones, portable information terminals, displays used for meter panels of an automobile and the like, displays used for meter panels of various types of equipment, devices, and apparatuses, automatic ticket sales machines, ATMs, and the like, and various types of flat panel displays (FPD) for the display of text, symbols, or images. Examples of devices include display devices such as CRT displays, liquid crystal displays, plasma displays, organic EL displays, inorganic EL displays, LED displays, surface-conduction electron-emitter displays (SED), field emission displays (FED), or the like, and use is possible for touch panels using the display devices. The film of the present invention is used to prevent damage to the surface of the display, prevent contamination, prevent attachment of fingerprints, prevent static electricity, prevent reflection, and prevent people from peeping at the display.

EXAMPLES

The present invention will be described below using examples, but the present invention is not limited thereto. The following compounds were used in the examples described below.

Component (A)
- Component (A1): $M_{0.13}T^{Tfp}_{0.78}Q_{0.09}$ (Mw=$1.85 \times 10^3$)
- Component (A2): $M_{0.05}T^{Tfp}_{0.73}Q_{0.22}$ (Mw=$1.85 \times 10^3$)
- Component (A3): $M_{0.14}T^{Tfp}_{0.55}Q_{0.31}$ (Mw=$1.85 \times 10^3$)
- Component (A4): $M_{0.13}T^{Tfp}_{0.66}Q_{0.21}$ (Mw=$1.85 \times 10^3$)
- Component (A5): $M_{0.10}T^{Tfp}_{0.69}Q_{0.21}$ (Mw=$1.85 \times 10^3$)
- Component (A6): $M_{0.13}T^{Tfp}_{0.54}Q_{0.33}$ (Mw=$1.85 \times 10^3$)
- Component (A7): $M_{0.35}T^{Tfp}_{0.19}Q_{0.46}$ (Mw=$1.85 \times 10^3$)
- Component (A8): $M_{0.21}T^{Tfp}_{0.68}Q_{0.11}$ (Mw=$1.85 \times 10^2$)

In the aforementioned formulas, $T^1$ represents a (3,3,3-trifluoropropyl) $SiO_{3/2}$ group, M represents a trimethyl silyl group, and Q represents a $SiO_{4/2}$ group.

Mw is the weight average molecular weight of the components, and is a weight average molecular weight as calculated by polystyrene measured by GPC (gel permeation chromatography), using tetrahydrofuran (THF) in a solvent.

The structure of the organopolysiloxane was confirmed by $^{29}$Si-nuclear magnetic resonance spectroscopic analysis (JNM-ECA500, manufactured by JEOL Ltd.).

[Synthesis of Aforementioned Components (A1) to (A8)]

The aforementioned components (A1) to (A8) were synthesized by the following methods, and then the weight average molecular weight was determined by an analysis using gel permeation chromatography. Note that the structure of the organopolysiloxane was confirmed by $^{29}$Si-nuclear magnetic resonance spectroscopic analysis (JNM-ECA500, manufactured by JEOL Ltd.).

Synthesis Example 1: (A1)

3.15 g of hexamethyl disiloxane, 12.96 g of water, and 0.04 g of trifluoromethane sulfonic acid were introduced into a 200 mL flask equipped with a dripping funnel, thermometer, Dean-Stark tube, and reflux cooling tube, and then a mixture of 5.39 g of tetraethoxysilane and 45.24 g of trifluoropropyl trimethoxysilane was dripped at room temperature. After dripping, stirring was performed for one hour, and the heating to reflux was performed for four hours. After removing the generated methanol and ethanol, 32.98 g of 1,3-bis (trifluoromethyl) benzene and 0.17 g of potassium hydroxide were added. Generated water was distilled away while heating, and then heating to reflux was further performed for six hours. After cooling, 0.08 g of acetic acid was introduced into the system, and then neutralization was performed. Next, generated salt was filtered, and then 1,3-bis (trifluoromethyl) benzene was distilled away such that the solid content was 70.9 wt. % to obtain a product.

The weight average molecular weight was $1.85 \times 10^3$ based on an analysis using gel permeation chromatography. Furthermore, the product was confirmed to be a siloxane compound containing a trifluoropropyl group as expressed by structural formula $$(ME_3SiO_{0.5})_{0.13}(CF_3C_2H_4SiO_{1.5})_{0.78}(SiO_2)_{0.09}$$

based on 29Si-nuclear magnetic resonance spectroscopic analysis.

Synthesis Examples 2 to 10: Synthesis of (A2) to (A10)

Other than following the mass (g) of the components shown in Table 1 in the aforementioned Synthesis Example 1, the components (A2) to (A10) were synthesized similarly to the Synthesis Example 1.

The structure, weight average molecular weight, and amount of fluoroalkyl groups of the synthesized components are shown in Table 2.

TABLE 1

|  | Synthesis Example No. | | | | |
| --- | --- | --- | --- | --- | --- |
|  | 1 | 2 | 3 | 4 | 5 |
| Component | A1 | A2 | A3 | A4 | A5 |
| Hexamethyl Disiloxane | 3.15 | 0.97 | 3.16 | 3.16 | 2.02 |
| Water | 12.96 | 13.83 | 14.00 | 13.48 | 13.66 |

TABLE 1-continued

| | | | | | |
|---|---|---|---|---|---|
| Trifluoromethane Sulfonic Acid | 0.04 | 0.04 | 0.04 | 0.04 | 0.04 |
| Tetraethoxysilane | 5.39 | 9.99 | 16.23 | 10.80 | 10.38 |
| Trifluoropropyl Trimethoxysilane | 45.24 | 41.94 | 33.33 | 39.30 | 40.67 |
| 1,3-Bis (Trifluoromethyl) Benzene | 32.98 | 32.98 | 32.98 | 32.98 | 32.98 |
| Potassium Hydroxide | 0.17 | 0.17 | 0.17 | 0.17 | 0.17 |

| | Synthesis Example No. | | | | |
|---|---|---|---|---|---|
| | 6 | 7 | 8 | 9 | 10 |
| Component | A6 | A7 | A8 | A9 | A10 |
| Hexamethyl Disiloxane | 47.45 | 26.55 | 11.42 | 6.09 | 47.34 |
| Water | 210.1 | 34.02 | 25.01 | 25.2 | 202.2 |
| Trifluoromethane Sulfonic Acid | 0.60 | 0.10 | 0.08 | 0.06 | 0.60 |
| Tetraethoxysilane | 243.5 | 68.12 | 11.72 | 10.42 | 162.0 |
| Trifluoropropyl Trimethoxysilane | 499.9 | 38.14 | 85.31 | 81.84 | 589.4 |
| 1,3-Bis (Trifluoromethyl) Benzene | 494.7 | 82.45 | 65.96 | 65.0 | 494.7 |
| Potassium Hydroxide | 2.55 | 0.43 | 0.34 | 0.08 | 2.50 |

TABLE 2

| Component | A1 | A2 | A3 | A4 | A5 |
|---|---|---|---|---|---|
| M Unit | 0.13 | 0.05 | 0.14 | 0.13 | 0.10 |
| $T^{Tfp}$ Unit | 0.78 | 0.73 | 0.55 | 0.66 | 0.69 |
| Q Unit | 0.09 | 0.22 | 0.31 | 0.21 | 0.21 |
| Weight Average Molecular Weight | $1.85 \times 10^3$ | $1.09 \times 10^3$ | $1.09 \times 10^3$ | $1.88 \times 10^3$ | $1.52 \times 10^3$ |
| Ratio of Fluoroalkyl Groups* (mol %) | 67% | 83% | 57% | 63% | 70% |

| Component | A6 | A7 | A8 | A9 | A10 |
|---|---|---|---|---|---|
| M Unit | 0.13 | 0.35 | 0.21 | 0.14 | 0.13 |
| TTfp Unit | 0.54 | 0.19 | 0.68 | 0.74 | 0.66 |
| Q Unit | 0.33 | 0.46 | 0.11 | 0.12 | 0.21 |
| Weight Average Molecular Weight | $3.82 \times 10^3$ | $3.60 \times 10^3$ | $6.90 \times 10^2$ | $2.17 \times 10^3$ | $3.09 \times 10^3$ |
| Ratio of Fluoroalkyl Groups* (mol %) | 58% | 15% | 52% | 64% | 63% |

*The fluoroalkyl group is a trifluoropropyl group.

Component (B)

Component (B1): Double-terminated vinyl dimethylsiloxy group block, 3,3,3-trifluoropropyl methylsiloxane polymer (siloxane degree of polymerization (e1): 250, Amount of fluoroalkyl groups: 50 mol %)

Component (B2): Double-terminated vinyl dimethylsiloxy group block, 3,3,3-trifluoropropyl methyl dimethylsiloxane copolymer (siloxane degree of polymerization (e2): 390, Amount of fluoroalkyl groups: 20 mol %)

Component (C)

Component (C1): $M^H_{1.3}T^{Tfp}$ (Mw=$1.11\times10^3$)

Component (C2): $M^H_{1.7}Q$ (Mw=$1.00\times10^3$)

Component (C3): $M^H D^{Tfp}_{13} M^H$ (0.092 wt. % of silicon-bonded hydrogen atoms)

In the formulas, $M^H_{13}$ represents a $(CH_3)_2(H)SiO_{1/2}$ group, $T^{Tfp}$ represents a (3,3,3-trifluoropropyl) $SiO_{3/2}$ group, and Q represents a $SiO_{4/2}$ group. Mw is the weight average molecular weight of the components, and is a weight average molecular weight as calculated by polystyrene measured by GPC (gel permeation chromatography), using tetrahydrofuran (THF) in a solvent. The components were synthesized by a conventionally known method.

Component (D)

Component (D): Platinum-divinyl tetramethyl disiloxane complex (approximately 0.6 wt. % based on platinum concentration)

Component (E)

Component (E): 1,3-bis (trifluoromethyl) benzene

Hydrosilylation Reaction Suppressant

Component (I): 1,3,5,7-tetramethyl-1,3,5,7-tetravinyl cyclotetrasiloxane

[Measurement Method of Physical Properties of Obtained Material]

The physical properties of the cured product according to the present invention were measured by the following method.

1. Dynamic Viscoelasticity Measurement

MCR301 manufactured by Anton Paar was used in the dynamic viscoelasticity measurement for the following examples 1, 4, 5, 8 to 12, 16, and 17. The curable organopolysiloxane composition of the present invention was allowed to sit overnight at room temperature, and then cured for 15 minutes at 150° C. Thereafter, a disk-shaped sample with a thickness of approximately 1 mm and diameter of 8 mm was prepared, and measurements were performed increasing the temperature from −60° C. to 150° C. at a rate of 3° C. a minute at a strain of 0.1% and frequency of 1 Hz, using a parallel plate method.

2. Light Transmittance Measurement

The total light transmittance was measured using a Spectrophotometer CM-5 manufactured by Konica Minolta.

The curable organopolysiloxane composition of the present invention was applied onto polyethylene terephthalate (PET, thickness of 50 μm; Lumirror S10 manufactured by Toray) such that the thickness after curing was approximately 30 μm. This was allowed to sit overnight at room temperature and then cured for 15 minutes at 150° C., and the obtained film-shaped sample was supplied for measurements. The total light transmittance of the test body including the sample described in Example 12 below was 89%, and the same applies when samples described in other examples were used. When considering the total light transmittance of the PET that was used, the sample described in the examples have sufficient transparency for use.

3. Dielectric Constant Measurement

The dielectric constant was measured using a LCR6530P manufactured by Wayne Kerr. Other than using PET (FL50-3 manufactured by Japan Electronics Technology) in the substrate, measurements were performed using a 1 mm thick film-shaped sample prepared by the same method as the aforementioned 2.

4. Pressure-Sensitive Adhesive Force

An automatic coating machine (PI-1210 manufactured by Tester Sangyo) was used to apply the curable organopolysiloxane composition of the present invention onto a PET substrate (thickness: 50 μm) such that the thickness after curing was 100 μm. The sample was placed for approximately 60 minutes at 70° C. and then cured for 15 minutes at 150° C. The PET substrate (thickness: 50 μm; Lumirror S10 manufactured by Toray) was laminated onto the cured film sample to prepare a test piece. Measurements were performed in a 50% humidity environment and performed at 180° peel at a rate of 300 mm/min (RTC-1210 manufactured by Orientec).

5. Peeling Force Adhesion

Other than using PET (FL50-3 manufactured by Japan Electronics Technology) on a substrate on an application side, measurements were performed by the same method as the pressure-sensitive adhesive force.

Example 1

In a glass vial, 6.91 g of component (A1) (however, 9.87 g of a 70 mass % solution of (E) 1,3-bis (trifluoromethyl) benzene), 2.96 g of component (E), 6.90 g of component (B1), 0.09 g of component (C10, 0.01 g of component (D), and 0.01 g of component (I) were mixed to prepare a sample solution of Example 1. The composition and various physical properties of the component used in the test are shown in Table 3.

Examples 2 to 17

Other than using the components at amounts described in Table 3 and Table 4, sample solutions were prepared similarly to Example 1, and the aforementioned various measurements were performed.

Comparative Example 1

A sample was prepared similar to Example 1, except for using components (B1), (C1), (D), and (I) at the amounts described in Table 5.

Comparative Example 2

A sample was prepared similar to Example 1, except for using components (A7), (B1), (C1), (D), (E), and (I) at the amount described in Table 5.

Comparative Example 3

A sample was prepared similar to Example 2 except for using components (A6), (B2), (C2), (D), (E), and (I) at the amounts described in Table 5.

TABLE 3

| | Example No. | | | | | | | | | |
|---|---|---|---|---|---|---|---|---|---|---|
| | 1 | 2 | 3 | 4 | 5 | 6 | 7 | 8 | 9 | 10 |
| Component (A1) | 6.91 | 6.91 | 6.91 | | | | | | | |
| Component (A2) | | | | 6.91 | | | | | | |
| Component (A3) | | | | | 6.91 | | | 6.91 | | |
| Component (A4) | | | | | | 9.87 | | | 6.91 | |
| Component (A5) | | | | | | | 6.91 | | | 6.91 |
| Component (A6) | | | | | | | | | | |
| Component (A7) | | | | | | | | | | |
| Component (A8) | | | | | | | | | | |
| Component (B1) | 6.90 | 6.87 | 6.87 | 6.87 | 6.87 | 9.81 | 6.87 | 6.90 | 6.90 | 6.90 |
| Component (B2) | | | | | | | | | | |
| Component (C1) | 0.09 | 0.11 | 0.14 | 0.11 | 0.11 | 0.16 | 0.11 | 0.09 | 0.09 | 0.09 |
| Component (C2) | | | | | | | | | | |
| Component (D) | 0.01 | 0.01 | 0.01 | 0.01 | 0.01 | 0.012 | 0.01 | 0.01 | 0.01 | 0.01 |
| Component (E) | 2.96 | 2.96 | 2.96 | 2.96 | 2.96 | 4.23 | 2.96 | 2.96 | 2.96 | 2.96 |
| Component (I) | 0.01 | 0.01 | 0.01 | 0.01 | 0.01 | 0.014 | 0.01 | 0.01 | 0.01 | 0.01 |
| SiH/Vi Ratio | 1.0 | 1.3 | 1.6 | 1.3 | 1.3 | 1.3 | 1.3 | 1.0 | 1.0 | 1.0 |
| 25° C. Storage Elastic Modulus G' (MPa) | 0.009 | — | — | 0.10 | 0.09 | — | — | 0.07 | 0.03 | 0.03 |
| Transparency (Visual) | Transparent | Transparent | Transparent | Transparent | Transparent | Transparent | Transparent | Transparent | Transparent | Transparent |
| Specific Permittivity (1k Hz) | 5.7 | 5.7 | 5.7 | 6.2 | 5.2 | 5.8 | 5.9 | 5.2 | 5.6 | 5.6 |
| Pressure-Sensitive Adhesive Force (N/m) | 66.7 | 127.5 | 109.8 | 598.0 | 539.2 | 284.3 | 357.8 | 529.4 | 161.8 | 318.6 |
| Peeling Force (N/m) | — | — | — | — | 37.3 | 29.9 | 102.0 | 37.3 | 15.7 | 36.3 |

TABLE 4

| | Example No. | | | | | | |
|---|---|---|---|---|---|---|---|
| | 11 | 12 | 13 | 14 | 15 | 16 | 17 |
| Component (A1) | | | | | | | |
| Component (A2) | | | | | | | |
| Component (A3) | | | | | | | |
| Component (A4) | | | | | | | |
| Component (A5) | | | | | | | |
| Component (A6) | 6.91 | 6.91 | 6.91 | | | | |
| Component (A7) | | | | 9.87 | | | |
| Component (A8) | | | | | 9.99 | | |
| Component (A9) | | | | | | 50.00 | |
| Component (A10) | | | | | | | 50.00 |
| Component (B1) | 6.92 | 6.90 | 6.87 | 9.81 | | 47.52 | 47.52 |

TABLE 4-continued

| | Example No. | | | | | | |
|---|---|---|---|---|---|---|---|
| | 11 | 12 | 13 | 14 | 15 | 16 | 17 |
| Component (B2) | | | | 9.89 | | | |
| Component (C1) | 0.06 | 0.09 | 0.11 | | 0.16 | 0.235 | 0.235 |
| Component (C2) | | | | 0.09 | | | |
| Component (C3) | | | | | | 2.115 | 2.115 |
| Component (D) | 0.01 | 0.01 | 0.01 | 0.01 | 0.01 | 0.07 | 0.07 |
| Component (E) | 2.96 | 2.96 | 2.96 | 4.23 | 2.50 | 16.67 | 16.67 |
| Component (I) | 0.01 | 0.01 | 0.01 | 0.01 | 0.01 | 0.059 | 0.059 |
| SiH/Vi Ratio | 0.7 | 1.0 | 1.3 | 1.3 | 1.3 | 1.0 | 1.0 |
| 25° C. Storage Elastic Modulus G' (MPa) | 0.08 | 0.06 | — | — | — | 0.016 | 0.034 |
| Transparency (Visual) | Transparent | Transparent | Transparent | Transparent | Transparent | Transparent | Transparent |
| Specific Permittivity (1k Hz) | 5.2 | 5.0 | 5.2 | 3.7 | 5.3 | 5.4 | 5.6 |
| Pressure-Sensitive Adhesive Force (N/m) | 676.5 | 627.5 | 656.9 | 70.6 | 32.8 | 163 | 279 |
| Peeling Force (N/m) | 90>* | 45>* | 25>* | 12.7 | 2.6 | 16 | 37 |

*Maximum value is listed. Peeling force at a level that is practically not problematic as a pressure-sensitive adhesive.

TABLE 5

| | Comparative Example No. | | |
|---|---|---|---|
| | Comparative Example 1 | Comparative Example 2 | Comparative Example 3 |
| Component (A1) | | | |
| Component (A2) | | | |
| Component (A3) | | | |
| Component (A4) | | | |
| Component (A5) | | | |
| Component (A6) | | | 9.87 |
| Component (A7) | | 6.91 | |
| Component (A8) | | | |
| Component (B1) | 6.87 | 6.90 | |
| Component (B2) | | | 9.89 |
| Component (C1) | 0.11 | 0.09 | |
| Component (C2) | | | 0.09 |
| Component (D) | 0.01 | 0.01 | 0.01 |
| Component (E) | | 2.96 | 4.23 |
| Component (I) | 0.01 | 0.01 | 0.01 |
| SiH/Vi Ratio | 1.3 | 1.0 | 1.3 |
| 25° C. Storage Elastic Modulus G' (MPa) | — | — | — |
| Transparency (Visual) | Transparent | Not Compatible, Cloudy White | Not Compatible, Cloudy White |
| Specific Permittivity (1k Hz) | — | — | — |
| Pressure-Sensitive Adhesive Force (N/m) | Pressure-Sensitive Adhesion Not Expressed | — | — |
| Peeling Force (N/m) | — | — | — |

The invention claimed is:

1. A curable organopolysiloxane composition containing a fluoroalkyl group, the curable organopolysiloxane composition comprising:
   (A) 1 to less than 80 mass % of an organopolysiloxane as expressed by average unit formula (I) with regard to the sum of components (A) to (D)

$$(R^1{}_3SiO_{1/2})_a(R^2{}_2SiO)_b(R^3SiO_{3/2})_c(SiO_2)_d \qquad (I)$$

where 10 mol % or more of all substitution groups on a silicon atom as expressed by $R^1$, $R^2$, and $R^3$ are fluoroalkyl groups as expressed by $(C_pF_{2p+1})$—R— where R represents an alkylene group with 1 to 10 carbon atoms, and p represents an integer from 1 to 8,
   where the substitution groups as expressed by $R^1$, $R^2$, and $R^3$ are the same or different fluoroalkyl groups, alkyl groups with 1 to 12 carbon atoms, alkenyl groups with 2 to 12 carbon atoms, aryl groups with 6 to 20 carbon atoms, aralkyl groups with 7 to 20 carbon atoms, a hydroxyl group, or alkoxy groups with 1 to 6 carbon atoms, and
   where a, b, c, and d are numbers that satisfy $0 \le a \le 0.5$, $0 \le b \le 0.7$, $0 \le c \le 1$, $0 \le d \le 0.7$, $0.3 \le c+d \le 1$, and $a+b+c+d=1$;
   (B) 20 to less than 99 mass % of an organopolysiloxane as expressed by average unit formula (II) with regard to the sum of components (A) to (D)

$$R^4{}_3Si(OSiR^4{}_2)_eOSiR^4{}_3 \qquad (II)$$

where 5 mol % or more of all substitution groups on a silicon atom as expressed by $R^4$ are fluoroalkyl groups as expressed by $(C_pF_{2p+1})$—R— where R and p are the same as above,
   where $R^4$ is the same or different fluoroalkyl groups, alkyl groups with 1 to 12 carbon atoms, alkenyl groups with 2 to 12 carbon atoms, aryl groups with 6 to 20 carbon atoms, aralkyl groups with 7 to 20 carbon atoms, a hydroxyl group, or alkoxy groups with 1 to 6 carbon atoms,
   where of all of the $R^4$s, at least two are alkenyl groups with 2 to 12 carbon atoms, and
   where e represents a number that satisfies $5 < e < 100,000$;
   (C) an organohydrogen polysiloxane having at least two silicon-bonded hydrogen atoms in a molecule in an amount where the silicon atom-bonded hydrogen atoms in the molecule are 0.1 to 40 mols with regard to a total amount of 1 mol of alkenyl groups of component (A) and component (B);
   (D) an effective amount of a hydrosilylation reaction catalyst; and
   (E) 0 to 2,000 parts by mass of a solvent with regard to 100 parts by mass of the sum of components (A) to (D);
   wherein the sum of components (A) and (B) is less than 100 mass % and the sum of components (A) to (D) is 100 mass %.

2. The curable organopolysiloxane composition according to claim 1, wherein $0 < c \le 1$.

3. The curable organopolysiloxane composition according to claim 1, wherein the substitution group as expressed by $R^1$, $R^2$, and $R^3$ for component (A) is the fluoroalkyl group, alkyl group with 1 to 12 carbon atoms, aryl group with 6 to 20 carbon atoms, aralkyl group with 7 to 20 carbon atoms, hydroxyl group, or alkoxy group with 1 to 6 carbon atoms.

4. The curable organopolysiloxane composition according to claim 1, wherein the fluoroalkyl group as expressed by $(C_pF_{2p+1})$—R— in component (A) and component (B) is a trifluoropropyl group.

5. The curable organopolysiloxane composition according to claim 1, wherein component (C) is an organohydrogen polysiloxane having a group containing fluorine.

6. The curable organopolysiloxane composition according to claim 1, wherein component (C) is an organohydrogen polysiloxane having a fluoroalkyl group as expressed by $(C_pF_{2p+1})$—R—, where R and p are the same as above, in a molecule.

7. The curable organopolysiloxane composition according to claim 1, wherein component (C) is a resin organohydrogen polysiloxane having a trifluoropropyl group in a molecule.

8. A pressure-sensitive adhesive composition, comprising the curable organopolysiloxane composition according to claim 1.

9. A cured product formed by curing the curable organopolysiloxane composition according to claim 1.

10. A pressure-sensitive adhesive layer formed by curing the curable organopolysiloxane composition according to claim 1.

11. The pressure-sensitive adhesive layer according to claim 10, which is in a film form and is substantially transparent.

12. A display or display panel, comprising the pressure-sensitive adhesive layer according to claim 11.

13. A laminate body, comprising a cured layer formed by curing the curable organopolysiloxane composition according to claim 1 on a film substrate.

14. The laminate body according to claim 13, wherein the cured layer is a pressure-sensitive adhesive layer, and a peeling layer with regard to the pressure-sensitive adhesive layer is provided on a film substrate.

15. A member for a display device or an electronic material, formed by curing the curable organopolysiloxane composition according to claim 1.

16. A display device or an electronic component, comprising the member according to claim 15.

17. A touch panel comprising:
a substrate on which a conductive layer is formed on one surface; and
a cured layer formed by curing the curable organopolysiloxane composition according to claim 1, adhered to the conductive layer of the substrate or a surface on an opposite side thereof.

18. The touch panel according to claim 17, wherein the substrate is a resin film or glass plate on which an ITO layer is formed on one surface.

* * * * *